United States Patent
Tomobe et al.

(10) Patent No.: US 8,311,736 B2
(45) Date of Patent: Nov. 13, 2012

(54) NAVIGATION DEVICE, NAVIGATION METHOD AND NAVIGATION SYSTEM

(75) Inventors: Osamu Tomobe, Mito (JP); Yukihiro Kawamata, Hitachi (JP); Yukio Miyazaki, Hitachinaka (JP); Takayoshi Shimokawa, Yokohama (JP)

(73) Assignees: Hitachi, Ltd., Tokyo (JP); Clarion Co., Ltd., Saitama-shi (JP)

( * ) Notice: Subject to any disclaimer, the term of this patent is extended or adjusted under 35 U.S.C. 154(b) by 69 days.

(21) Appl. No.: 12/996,258

(22) PCT Filed: Jun. 4, 2009

(86) PCT No.: PCT/JP2009/060248
§ 371 (c)(1),
(2), (4) Date: Jan. 7, 2011

(87) PCT Pub. No.: WO2009/148118
PCT Pub. Date: Dec. 10, 2009

(65) Prior Publication Data
US 2011/0106431 A1 May 5, 2011

(30) Foreign Application Priority Data
Jun. 4, 2008 (JP) ................................. 2008-146597

(51) Int. Cl.
*G08G 1/123* (2006.01)
(52) U.S. Cl. ......... 701/450; 701/421; 701/461; 701/465
(58) Field of Classification Search .................. 701/200, 701/400, 421, 450, 461, 465
See application file for complete search history.

(56) References Cited

U.S. PATENT DOCUMENTS

| 6,253,152 B1* | 6/2001 | Ito ................................. 701/411 |
| 2004/0133343 A1 | 7/2004 | Hashida et al. |
| 2005/0093720 A1* | 5/2005 | Yamane et al. .......... 340/995.13 |
| 2005/0234639 A1* | 10/2005 | Endo et al. .................... 701/209 |
| 2006/0106534 A1 | 5/2006 | Kawamata et al. |

FOREIGN PATENT DOCUMENTS

| JP | 11-237251 A | 8/1999 |
| JP | 2004-198841 A | 7/2004 |
| JP | 2005-10060 A | 1/2005 |
| JP | 2005-258340 A | 9/2005 |
| JP | 2006-64664 A | 3/2006 |
| JP | 2008-20486 A | 1/2008 |
| WO | WO 2007/072734 A1 | 6/2007 |

OTHER PUBLICATIONS

International Search Report with English translation dated Jul. 7, 2009 (Four (4) pages), for PCT/JP2009/060248.
PCT/ISA/237 (Three (3) pages), for PCT/JP2009/060248, Jul. 7, 2009.

\* cited by examiner

*Primary Examiner* — Behrang Badii
*Assistant Examiner* — Navdeep Mand
(74) *Attorney, Agent, or Firm* — Crowell & Moring LLP

(57) ABSTRACT

A navigation device receives a differential map data from a map delivery server via a communication line. The map delivery server checks whether there is a new intersection on a navigation route searched by the navigation device after updating a map data. The navigation device acquires a differential map data containing the intersection from the map delivery server. Then, an update map data selection section determines whether the intersection can be updated in time. An update order determination section updates the differential map data which can be updated in time in ascending order of time required to reach the intersection.

9 Claims, 20 Drawing Sheets

FIG.3
(a)
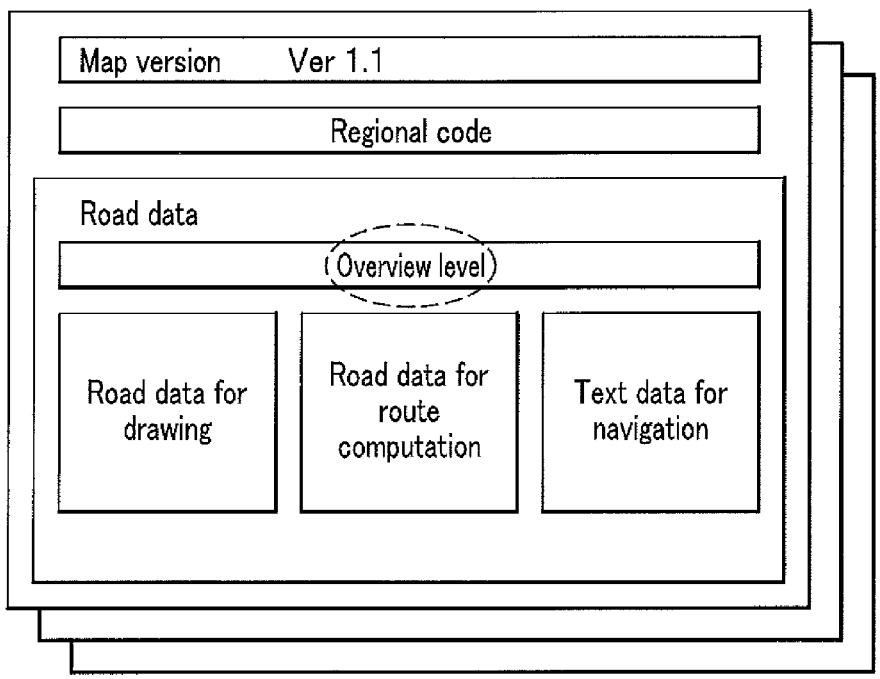
(b)
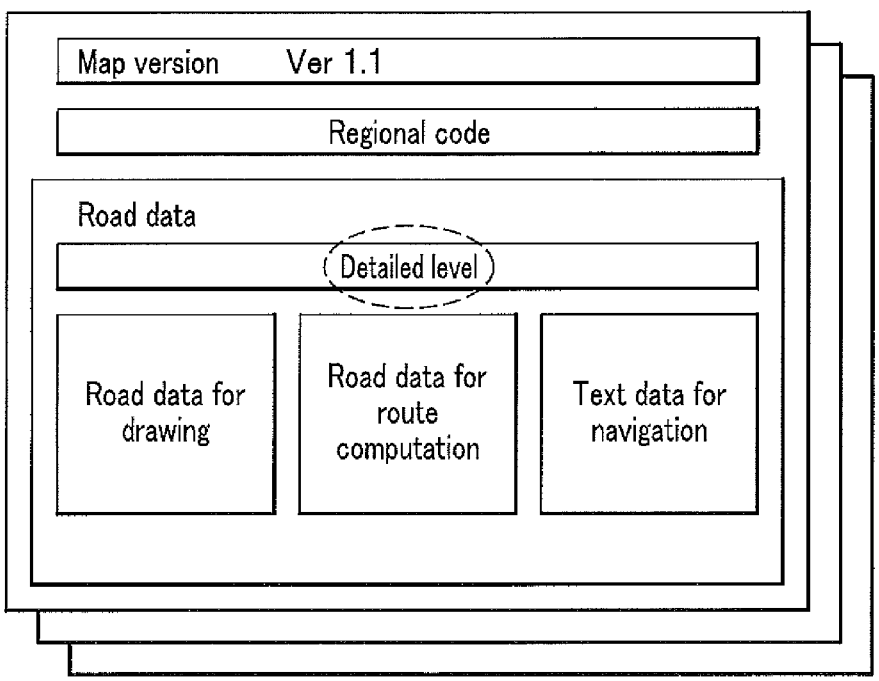

NAVIGATION DEVICE, NAVIGATION METHOD AND NAVIGATION SYSTEM

FIELD OF THE INVENTION

The present invention relates to a navigation device, a navigation method and a navigation system.

BACKGROUND OF THE INVENTION

Navigation devices which display a current position of a vehicle or search information on a route to a desired destination for guiding a driver of the vehicle have been widely used in recent years. In order to perform display of a current position, search of a route, and navigation guidance, such a navigation device is equipped with map data which is divided by scale size according to an area of a region represented by the map. The scale sizes (levels) of a map data are hierarchically arranged from, for example, an "overview level" of 10 km×10 km in area down to, for example, a "detailed level" of 2.5 km×2.5 km in area, or further down to a more detailed level.

The map data can be obtained from a recording medium such as a DVD (Digital Versatile Disc) and a HDD (Hard Disk Drive) or a recording device. Recently, the map data can also be downloaded into a hard disk via a communication line. Actually, however, a network of roads is ever changing according to opening or closing of a road or the like. The map data once obtained has to be frequently updated such that the latest road network situation is reflected.

Regarding the update of a map data as mentioned above, if a navigation device having a hard disk capable of obtaining a map data via a communication line is used, there has been disclosed a technique of updating a map data by acquiring only a differential map data which is a data on a portion requiring an update, from a map delivery server (see, for example, Patent Document 1). The technique intends to reduce a map data update time and communication cost because such a portion to be changed of the map data typically accounts for only a small percentage.

Another technique discloses that, in order to compatibly conduct a map data update in a hard disk and navigation guidance (a navigation processing), respective operations for the update and the navigation guidance are made independent of each other and are performed in parallel by setting a cache memory and making the cache memory hold the map data in a cache (see, for example, Patent Document 2).

Prior Art Documents
Patent Documents
Patent Document 1: Japanese Laid-Open Patent Application, Publication No. 2004-198841
Patent Document 2: Japanese Laid-Open Patent Application, Publication No. 2005-258340

SUMMARY OF THE INVENTION

Problems to be Solved by the Invention

However, if the technique described in Patent Document 1 is used for updating a map data in a navigation device based on a delivered differential map data during driving in Tokyo, for example, it sometimes takes nearly 30 minutes to update the map data. This is largely because system resource such as CPU performance and memory capacity of the navigation device which is an incorporated device is limited. Thus, if a navigation route is searched again (re-routed) based on the delivered differential map data while a vehicle is moving, navigation guidance is not conducted during the re-routing. Additionally, before the re-routing is completed, the vehicle keeps moving for 30 minutes more, for example, in this case. Even if there is a new appropriate intersection on a newly-constructed road within a 30-minute drive, the vehicle will disadvantageously pass through the intersection. As a result, navigation guidance based on the latest road situation cannot be realized. Thus, the technique is thus not sufficient to immediately enjoy advantage of the map data update.

In the technique described in Patent Document 2, a map data in a hard disk of the navigation device is updated, but the map data in a cache memory is not updated. Guidance of a navigation route is conducted using the map data before updated, thus failing to conduct an appropriate re-route search and navigation guidance based on the latest road situation after updated.

In light of the background described above, the present invention has been made in an attempt to provide a navigation device, a navigation method and a navigation system in which update of a differential map data and navigation guidance based on the latest map data is performed in parallel by determining an update order of one or more differential map data.

Means for Solving the Problems

To solve the problems described above, in a navigation device, a navigation method and a navigation system of the present invention, an arrival time from a current position to a new intersection is compared with a time required for updating a differential map data; an intersection, update of differential map data of which can be completed before a vehicle arrives thereat is selected; and one or more differential map data is updated in order of arrival times at the intersection from shortest to longest.

Advantageous Effects of the Invention

A navigation device, a navigation method and a navigation system are provided in which update of a differential map data and navigation guidance based on a latest map data can be performed in parallel by determining an update order of the differential map data.

BRIEF DESCRIPTION OF THE DRAWINGS

[FIG. 3] Diagrams each illustrating an example of a map data recorded in a map database according to the embodiment.

EMBODIMENT FOR CARRYING OUT THE INVENTION

Below is described in detail an embodiment for carrying out the present invention with reference to related drawings.

Figure 1:
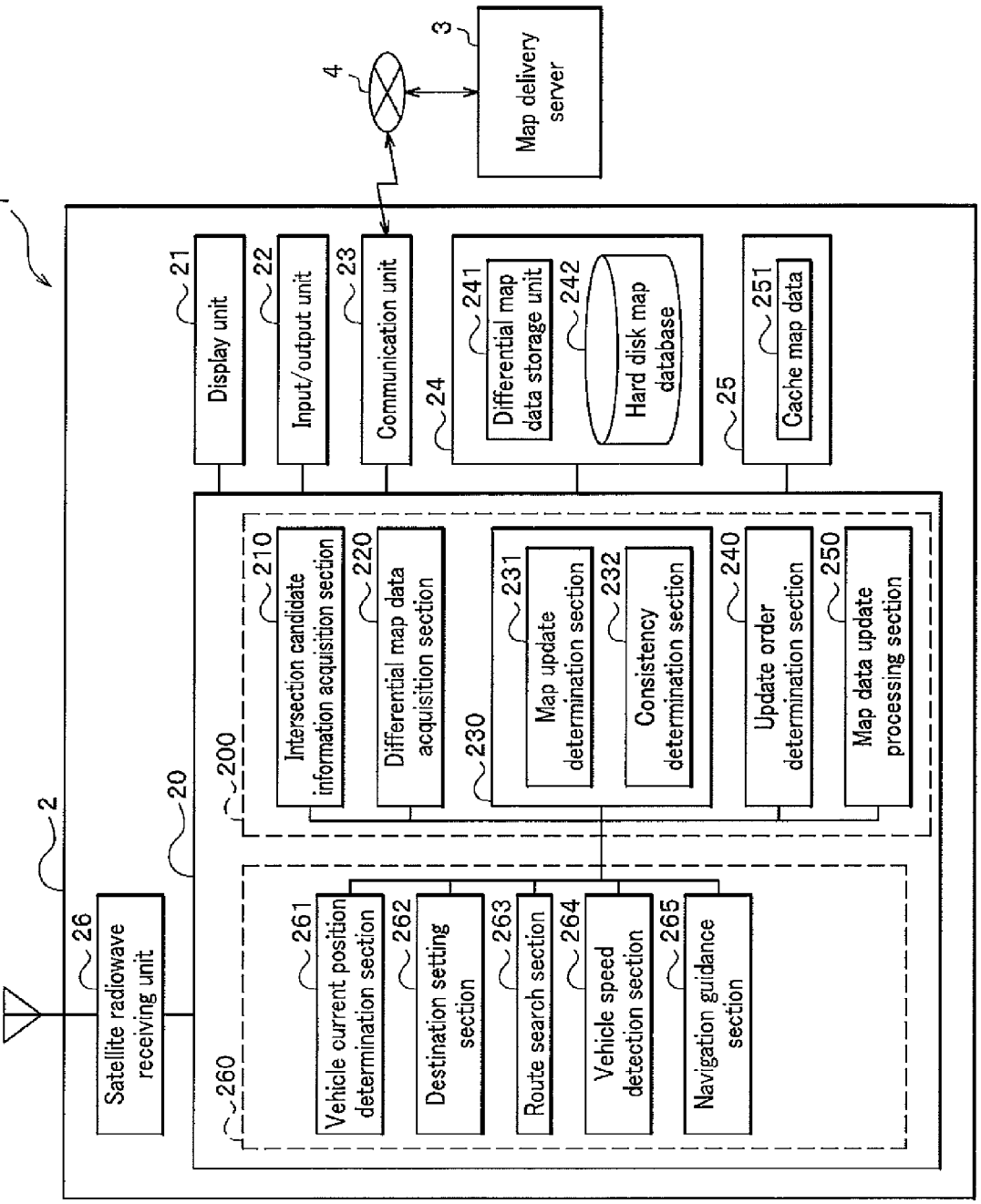
[FIG. 1] A functional block diagram illustrating a configuration of a navigation system according to an embodiment of the present invention.

FIG. 1 is a functional block diagram illustrating a configuration example of a navigation system 1 according to an embodiment of the present invention. FIG. 1 also illustrates a configuration example of a navigation device 2 as a functional block diagram.

The navigation system 1 includes the navigation device 2 and a map delivery server 3. The navigation device 2 and the map delivery server 3 are communicably connected to each other via a communication line 4 by wireless.

The navigation device 2 includes a display unit 21, an input/output unit 22, a communication unit 23, a storage unit 24, a memory unit 25, a satellite radiowave receiving unit 26, and a control unit 20. Respective functions of the display unit 21, the input/output unit 22, the communication unit 23, and the control unit 20 are realized when, for example, a CPU (Central Processing Unit) loads a program stored in a hard disk of the navigation device 2 into a RAM (Random Access Memory) and executes the program.

The display unit 21 is configured by a liquid crystal display or the like and displays a road situation, a navigation guidance, or the like according to a processing for navigation, under control of the control unit 20. The display unit 21 also displays a screen on which an instruction from outside is inputted via the input/output unit 22.

The input/output unit 22 is configured by, for example, a remote control or a touch panel and receives an instruction from outside to the navigation device 2. The input/output unit 22 outputs a vocal guidance or the like via a speaker not shown or the like according to various processings performed by the navigation device 2 under control of the control unit 20.

The communication unit 23 transmits intersection candidate request information which contains at least a current position of the navigation device 2, a destination, and a map version of a map data held by the navigation device 2, to the map delivery server 3 via the communication line 4 under control of the control unit 20. The communication unit 23 acquires intersection candidate information which is information on a candidate of an intersection newly extracted on a navigation route of the navigation device 2, and a differential map data, from the map delivery server 3 under control of the control unit 20.

The storage unit 24 is configured by an auxiliary storage device such as a hard disk and a flash memory and includes a differential map data storage unit 241 and a hard disk map database 242.

The differential map data storage unit 241 records the differential map data which the control unit 20 receives from the map delivery server 3 via the communication unit 23. The differential map data used herein means a data which differs from each other between a pair of map data before and after an update is performed. In this embodiment, the differential map data can be created by extracting a different portion of two versions of a single map data (to be described later in detail).

The hard disk map database 242 stores therein, for example, as a relational database, an electronically-available map data in which a region on a map is represented in different scale sizes down from an overview level (for example, a 10-square-kilometer patch) to a detailed level (for example, a 2.5-square-kilometer patch) (which may be simply referred to as a "map data" hereinafter).

FIG. 3(a) and FIG. 3(b) are diagrams each illustrating an example of a data structure of a map data stored in the hard disk map database 242. FIG. 3(a) illustrates the map data at an "overview level", and, FIG. 3(b), at a "detailed level". The map data includes a map version, a regional code, and a road data. The road data includes: level information showing an "overview level" or a "detailed level"; a road data for drawing which is used for drawing a prescribed range, in the center of which a current position (vehicle position) of the navigation device 2a is located; a road data for route computation which is used for searching an optimum route to a destination; and a text data for navigation which provides a sign or the like indicating a traveling direction of a vehicle for navigation.

Figure 4:
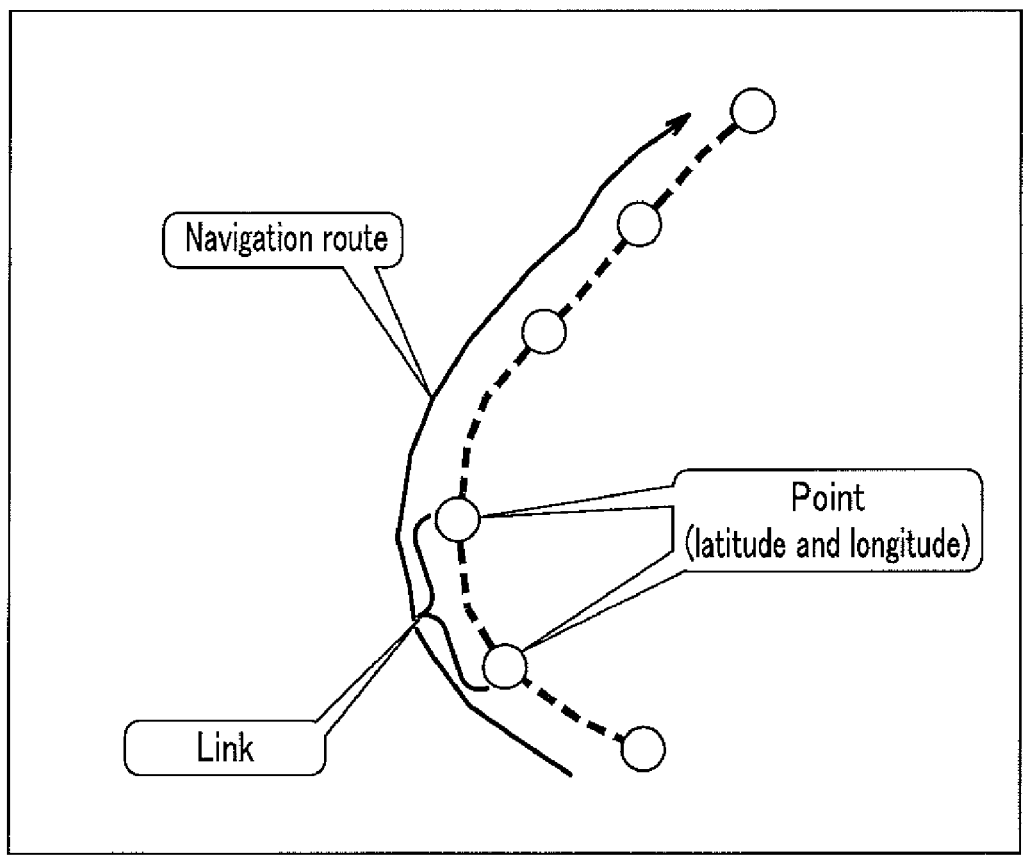
[FIG. 4] An explanatory diagram illustrating a navigation route data road data according to the embodiment.

FIG. 4 is an explanatory diagram illustrating a relationship between a position and a distance included in the road data for route computation of a road data. As shown in FIG. 4, the road data includes: a pair of points which are represented by respective latitudes and longitudes (which may also be represented by respective point IDs); and a link which connects the two points (which may also be represented by a link ID). A navigation route is constituted by a link string in which a plurality of links are connected in line. The information as described above is stored as a map data in the hard disk map database 242.

Referring back to FIG. 1, the memory unit 25 temporarily memorizes a cache map data 251 which is a map data on a prescribed range including (a surrounding area of) a current position of the navigation device 2 (that is, a position of the vehicle) and is read from the hard disk map database 242 of the storage unit 24. The memory unit 25 is realized by a RAM (Random Access Memory), a cache memory, or the like.

The satellite radiowave receiving unit 26 receives information on a current position of the navigation device 2 (a position of the vehicle) using radiowave from a satellite.

The control unit 20 controls the entire navigation device 2 and includes a navigation control section 260 and a map data update section 200.

The navigation control section 260 includes a vehicle current position determination section 261, a destination setting section (which may also be referred to as a setting section) 262, a route search section 263, a vehicle speed detection section 264, and a navigation guidance section 265. The navigation control section 260 controls entire operations of navigation guidance (a navigation processing).

The vehicle current position determination section 261 computes a current position of the navigation device 2 (a position of the vehicle), based on the information received by the satellite radiowave receiving unit 26. The destination setting section (setting section) 262 sets position information inputted by a user as a destination via the input/output unit 22. The route search section 263 searches an optimum route between the current position of the navigation device 2 computed by the vehicle current position determination section 261 and the destination set by the destination setting section 262. The vehicle speed detection section 264 detects a speed at which the navigation device 2 is traveling (a speed of the vehicle) using a speed sensor not shown.

The navigation guidance section 265 displays a navigation route to the destination and the like on the display unit 21, based on the route searched by the route search section 263. The navigation guidance section 265 also makes the display unit 21 display a candidate of an intersection after the intersection candidate information acquisition section 210 acquires intersection candidate information 700 (see FIG. 7) from the map delivery server 3.

The map data update section 200 receives a differential map data from the map delivery server 3 via the communication unit 23 and provides control on an update of the hard disk map database 242.

The map data update section 200 includes an intersection candidate information acquisition section 210, a differential map data acquisition section 220, an update map data selection section 230, an update order determination section 240, and a map data update processing section 250.

The intersection candidate information acquisition section 210 transmits intersection candidate request information 500 which is information for requesting intersection candidate information 700 on a new intersection on the navigation route searched by the route search section 263, to the map delivery server 3 via the communication unit 23.

Figures 5, 6:
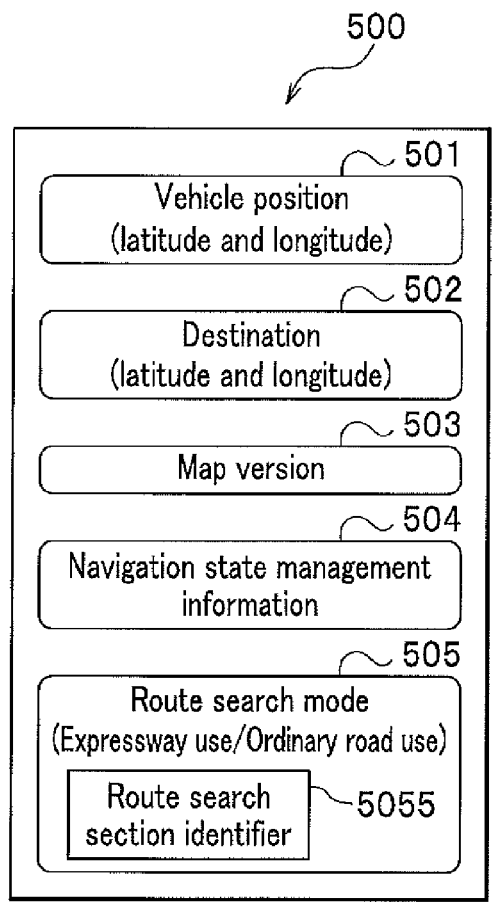
[FIG. 5] A diagram illustrating an example of a data configuration of intersection candidate request information according to the embodiment.
[FIG. 6] A diagram illustrating an example of navigation state management information according to the embodiment.

FIG. 5 is a diagram illustrating a data configuration of the intersection candidate request information 500 according to this embodiment. As shown in FIG. 5, the intersection candidate request information 500 includes at least: a vehicle current position 501 which is information on a current position of the navigation device 2; a destination 502; and a map version 503 of a map data held by the navigation device 2. The intersection candidate request information 500 may further include: navigation state management information 504 which is information on a setting state of the navigation device 2; and a route search mode 505 which is information indicating that a navigation route is searched by giving priority to a use of either an expressway or an ordinary road.

FIG. 6 is a diagram illustrating an example of a specific data configuration of the navigation state management information 504. As shown in FIG. 6, the navigation state management information 504 provides information on the navigation device 2 and includes navigation state attributes of "destination setting" and "route search". Respective values thereof include: "not yet" indicating that a corresponding operation has not yet been performed; "in operation" indicating that a corresponding operation is underway; and "completed" indicating that a corresponding operation has already been completed.

The intersection candidate information acquisition section 210 also acquires the intersection candidate information 700 which is generated by the map delivery server 3 and is information on an intersection candidate to be newly set on the navigation route.

A specific data configuration of the intersection candidate information 700 is to be described hereinafter (see FIG. 7).

Referring back to FIG. 1, the differential map data acquisition section 220: acquires a differential map data in a differential map data set 800 (see FIG. 8), which contains an intersection in the intersection candidate information 700 generated by the map delivery server 3, from the map delivery server 3; and makes the differential map data storage unit 241 store therein the data of the differential map data set 800.

The update map data selection section 230 compares an arrival time required by the navigation device 2 to arrive at an intersection from a current position thereof (a position of the vehicle), with a time required for the navigation device 2 to update a data of the differential map data set 800 acquired by the differential map data acquisition section 220. The update map data selection section 230 then selects a data of the differential map data set 800 which can be updated in time before the arrival time at the intersection, from among all data of the differential map data set 800 stored in the differential map data storage unit 241. If a data in the differential map data set 800 is selected by the update map data selection section 230 as updatable before the intersection arrival time, the selected data is taken as an update map data.

The update map data selection section 230 includes a map update determination section 231 and a consistency determination section 232.

The map update determination section 231 computes each arrival time from a candidate intersection, based on the current position of the navigation device 2 (the position of the vehicle) computed by the vehicle current position determination section 261 and on a traveling speed detected by the vehicle speed detection section 264. If the computed arrival time is longer than a threshold value set as a prescribed time required for updating a corresponding data in the differential map data set 800, the map update determination section 231 determines that the data in the differential map data set 800 is to be updated because the data is updatable by the map data update section 200 in time prior to the computed arrival time. This can prevent a data in the differential map data set 800 whose update is not necessary, from being taken as a target to be updated. The number of accesses to a hard disk can be therefore reduced, which is otherwise likely to cause an I/O bottleneck after the step performed by the map update determination section 231, for example, in a step performed by the consistency determination section 232. Additionally, a time required for computing an arrival time at an intersection for each data of the differential map data set 800 so as to determine an update order in the update order determination section 240 can be reduced. Thus, only a map data which actually needs an update can be an update target in a limited system resource of the navigation device 2.

The consistency determination section 232 determines whether or not point IDs at both ends of a link string contained in an update map data of the differential map data set 800 which the map update determination section 231 has determined to update are connectable to any links on the navigation route. If the point IDs at both ends of the update map data are not connectable to links on the navigation route, a corresponding road is one-way, and a route taking the road having the intersection does not lead to the destination. The route search section 263 thus skips a search of such a route as a candidate navigation route. In conducting a route search and a navigation guidance, the determination made by the consistency determination section 232 can prevent unnecessary update of a data in the differential map data set 800, which may otherwise confuse a user.

The update order determination section 240 determines an order of updating one or more update map data selected by the update map data selection section 230 such that the update map data is arranged in order of arrival times at an intersection from shortest to longest.

This makes it possible to update the update map data in order of less time to complete the updating to more time to complete the updating.

The map data update processing section 250 updates the hard disk map database 242 in the update order determined by the update order determination section 240, using the update map data. Based on the update of the hard disk map database 242 for each update map data, the map data update processing section 250 also updates the cache map data 251 stored in the memory unit 25.

The map data update processing section 250 performs the above processing for each map data scale size (level). First, an update map data in the largest scale size, for example, at the "overview level" is performed, and then, an update map data in a smaller scale size, for example, at the "detailed level" is performed. This makes it possible to search a route giving priority to an update of a map data representing a wider region, which has more influence on an arrival time at a destination.

Figure 2:
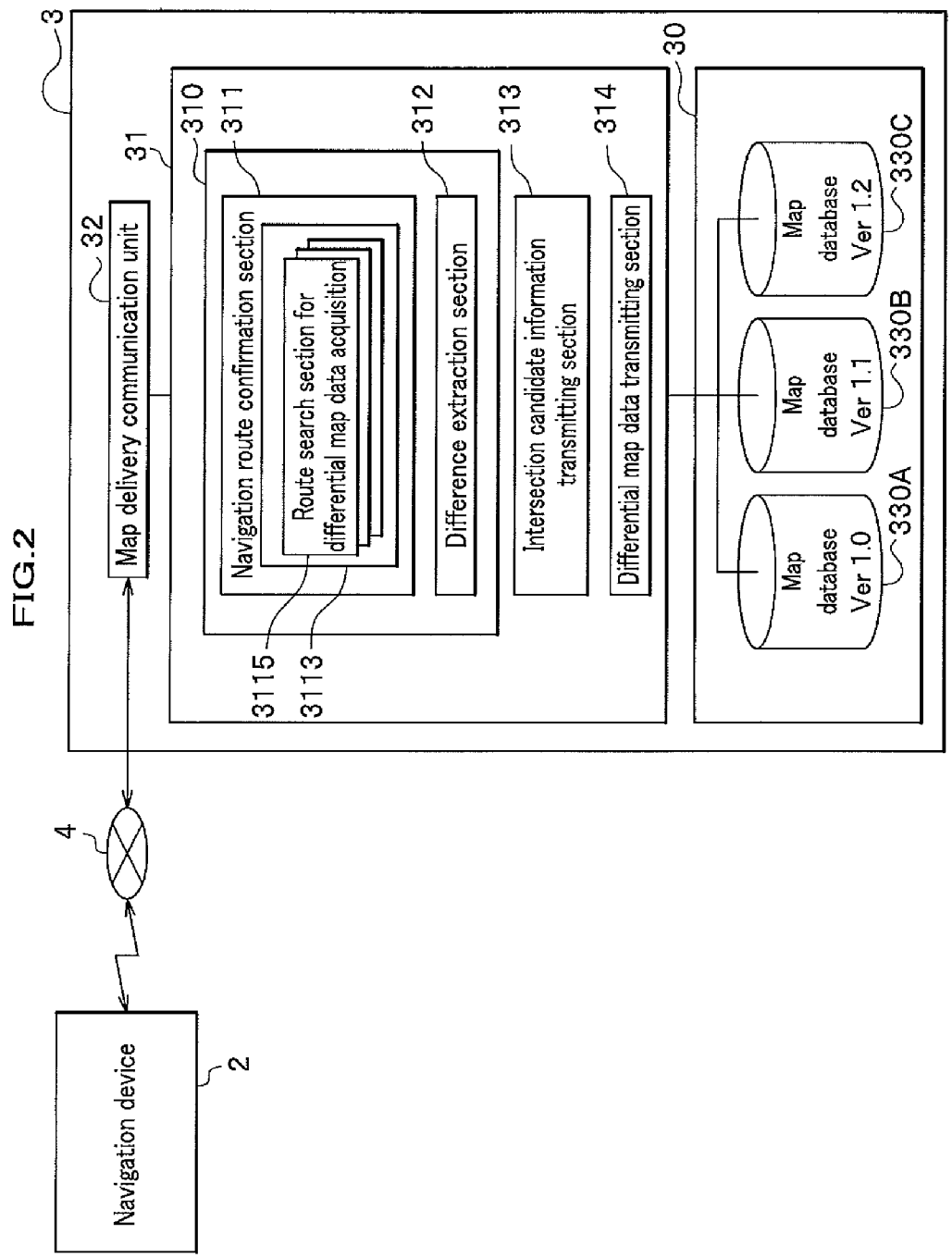
[FIG. 2] A functional block diagram illustrating a configuration of a map delivery server according to the embodiment.

Next is described the map delivery server 3 with reference to FIG. 2. FIG. 2 is a functional block diagram illustrating a configuration example of the map delivery server 3.

The map delivery server 3 is connected to the navigation device 2 via the communication line 4, receives the intersection candidate request information 500 from the navigation device 2, and transmits the intersection candidate information 700 (see FIG. 7), the differential map data set 800 (see FIG. 8), or the like, to the navigation device 2. The map delivery server 3 includes a map data storage unit 30, a map delivery control unit 31, and a map delivery communication unit 32. Note that functions of the map delivery control unit 31 and the map delivery communication unit 32 are realized by, for example, a CPU which loads a program stored in a hard disk of the map delivery server 3, into a RAM and executes the loaded program.

The map data storage unit 30 stores a map data for each map version, in map databases 330A, 330B, 330C, and is configured by a hard disk or the like.

The map delivery control unit 31 provides control on the entire map delivery server 3 and includes an intersection candidate information generation section 310, an intersection candidate information transmitting section 313, and a differential map data transmitting section 314.

The intersection candidate information generation section 310 references the map data storage unit 30 based on the intersection candidate request information 500 acquired from the navigation device 2 and thereby generates a list of intersection candidates on a navigation route. The intersection candidate information generation section 310 includes a navigation route confirmation section 311 and a difference extraction section 312.

The navigation route confirmation section 311 re-searches an optimum navigation route using information of the vehicle current position 501 and the destination 502 contained in the intersection candidate request information 500 transmitted from the navigation device 2.

If the map version 503 contained in the intersection candidate request information 500 transmitted from the navigation device 2 is different from the latest map version of the map data held by the map delivery server 3, the difference extraction section 312 generates a data of the differential map data set 800 which is a data on a different portion between the two map versions, based on a latest map version stored in the map data storage unit 30 of the map delivery server 3 and a map version of a map data held by the navigation device 2. The difference extraction section 312 then extracts an intersection having a point ID on a navigation route searched by the navigation route confirmation section 311 from among data of the generated differential map data set 800.

Figure 7:
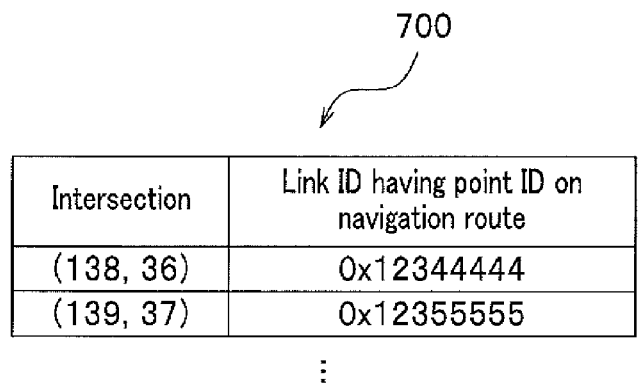
[FIG. 7] A diagram illustrating an example of intersection candidate information according to the embodiment.

FIG. 7 is a diagram illustrating a specific example of a data configuration of the intersection candidate information 700 generated by the intersection candidate information generation section 310. As shown in FIG. 7, the intersection candidate information 700 includes an intersection represented by a latitude and a longitude, and a link ID having a point ID on the navigation route. The intersection candidate information 700 indicates that there is a new intersection on the navigation route.

Referring back to FIG. 2, the intersection candidate information transmitting section 313 transmits the intersection candidate information 700 generated by the intersection candidate information generation section 310 to the navigation device 2 via the map delivery communication unit 32.

The differential map data transmitting section 314 transmits the differential map data set 800 generated by the difference extraction section 312 to the navigation device 2 via the map delivery communication unit 32.

Figure 8:
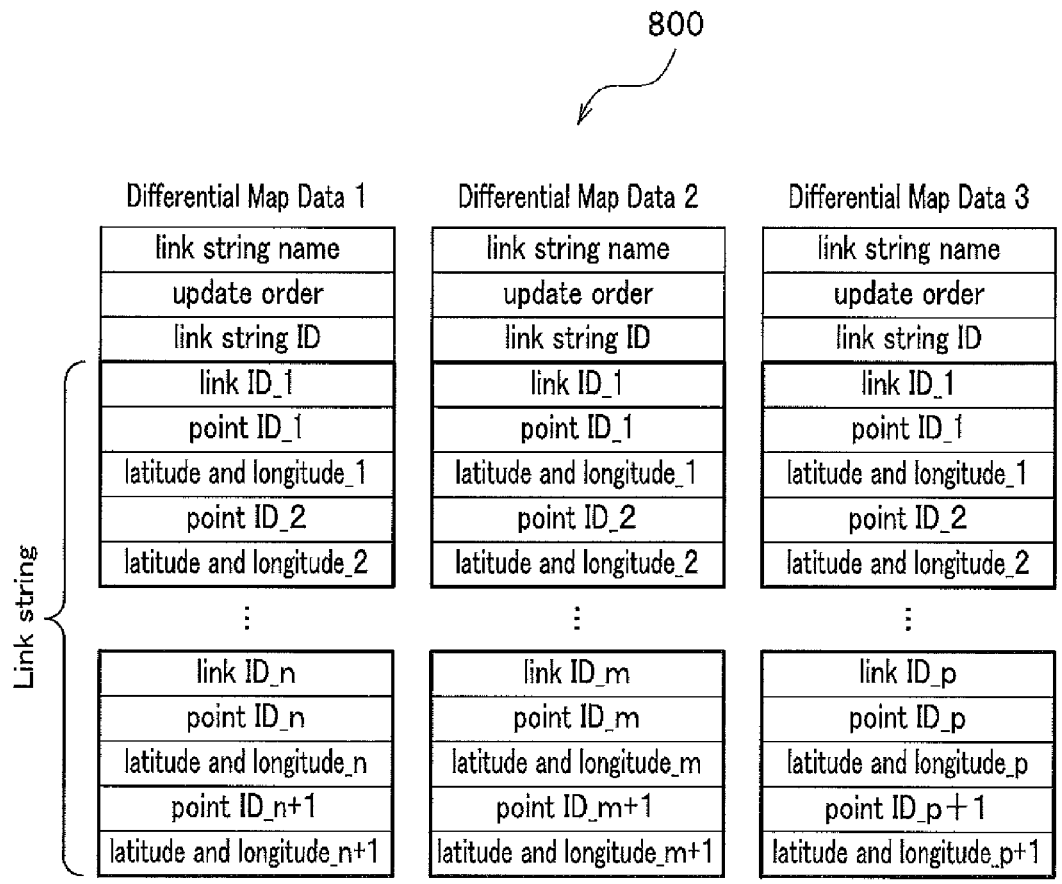
[FIG. 8] A diagram illustrating examples of a differential map data according to the embodiment.

FIG. 8 is a diagram illustrating a data configuration example of the differential map data set 800 generated by the difference extraction section 312. As shown in FIG. 8, each of a data in the differential map data set 800 includes a "link string name", an "order of update" which is determined by a processing performed by the navigation device 2, a "link string ID" including information on a scale size (level), and a "link string". The "link string" includes one or more links, each of which includes a "link ID", a "point ID" which is a pair of points at both ends of a link having the link ID, and a "latitude and longitude" which indicates a location of the point ID.

Referring back to FIG. 2, the map delivery communication unit 32 receives the intersection candidate request information 500 transmitted from the navigation device 2. The map delivery communication unit 32 also transmits the intersection candidate information 700 and the differential map data set 800 generated by the map delivery control unit 31 to the navigation device 2.

Next are described operations of the navigation system 1 according to this embodiment with reference to FIG. 9 through FIG. 19 as well as FIG. 1 and FIG. 2.

Figure 9:
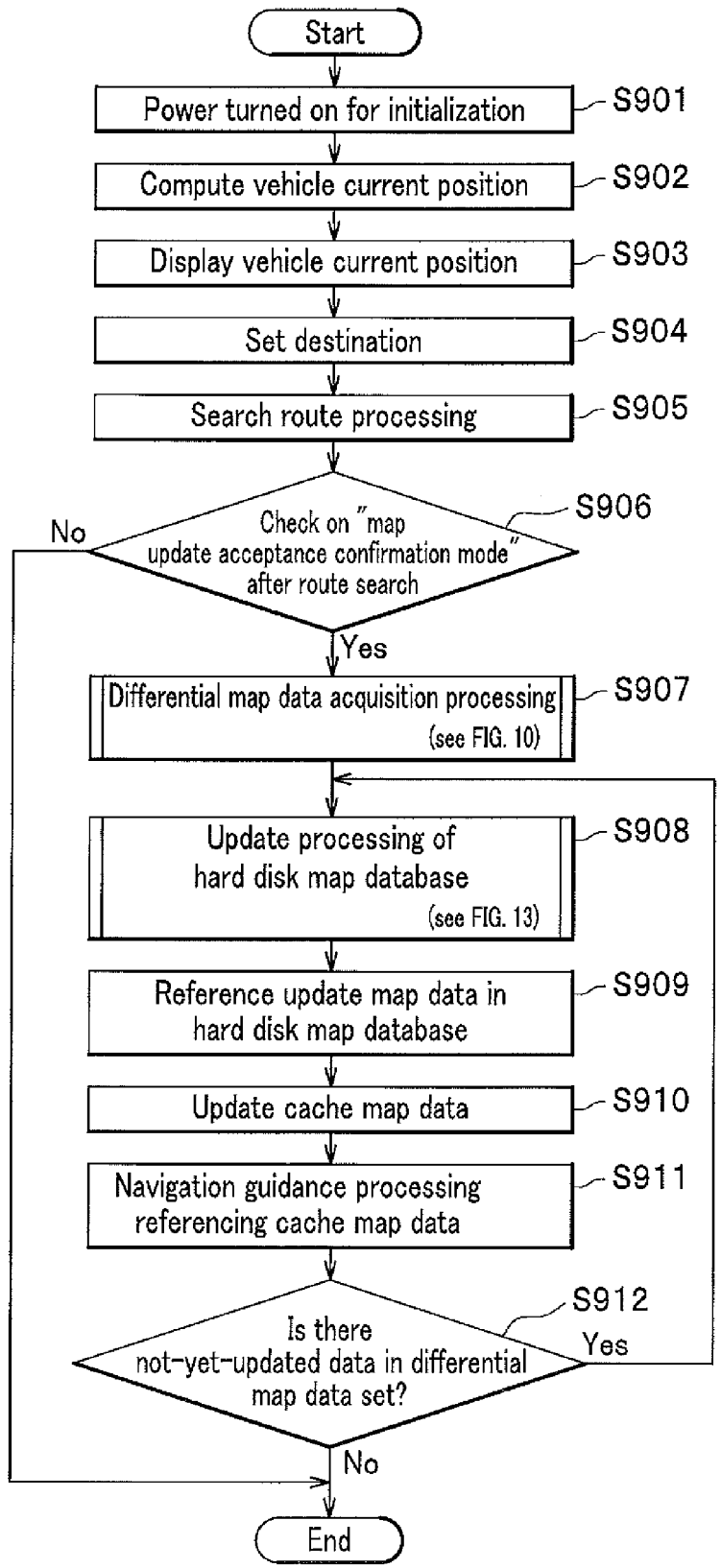
[FIG. 9] A flowchart illustrating operations of a navigation device according to the embodiment.

FIG. 9 is a flowchart illustrating operations of the navigation device 2 according to the embodiment.

The navigation device 2 is turned on and is initialized (step S901).

After the navigation device 2 is started up, the vehicle current position determination section 261 of FIG. 1 acquires information from the satellite radiowave receiving unit 26 and computes a current position of the navigation device 2 (a position of the vehicle) (step S902). The navigation guidance section 265 provides control to make the display unit 21 display thereon the position of the vehicle (step S903). A user enters a desired destination via the input/output unit 22, and the destination setting section 262 sets the destination (step S904). The route search section 263 performs a processing of searching a route between the vehicle current position computed by the vehicle current position determination section 261 and the destination set by the destination setting section 262 (step S905).

After the route search processing, the differential map data acquisition section 220 checks on a "map update acceptance confirmation mode", to which the user has already made an input of an appropriate confirmation at the navigation device 2. The "map update acceptance confirmation mode" is used for confirming with the user whether or not it is good for the user to execute an update processing of a map data in the navigation device 2. If it is determined that the user has inputted "Yes", the differential map data acquisition section 220 determines that the mode shows that an update of a latest map data is to be done. Meanwhile, if the user has inputted "No", the differential map data acquisition section 220 determines that a navigation processing is to be done using only an existing map data in the navigation device 2, without updating the map data.

If the "map update execution inquiry mode" has been set at "Yes" (if Yes in step S906), the processing advances to step S907 of a differential map data acquisition processing. If set at "No" (if No in step S906), the map data update processing is terminated.

If "Yes" in step S906, the differential map data acquisition processing is performed in the navigation device 2 (step S907). In the differential map data acquisition processing, the navigation device 2 acquires the intersection candidate information 700 (see FIG. 7) and the differential map data set 800 (see FIG. 8) from the map delivery server 3. Details of the differential map data acquisition processing will be described later (see FIG. 10).

In step S907, after acquiring the intersection candidate information 700 and the differential map data set 800, the navigation device 2 performs a processing of updating the hard disk map database 242 (see FIG. 1) (step S908). In the processing of updating the hard disk map database 242, the navigation device 2 selects an update map data which contains an intersection situated on a route specified by the user and whose update in the navigation device 2 can be completed in time before the vehicle arrives at the intersection, from among one or more data in the differential map data set 800 stored in the differential map data storage unit 241 (see FIG. 1). The hard disk map database 242 is updated based on the selected update map data in order of increasing intersection arrival times. Details of a specific flow of the processing will be described later with reference to FIG. 13 to FIG. 19.

After the update of the hard disk map database 242 is completed, the map data update processing section 250 of FIG. 1 provides control, so as to perform a navigation guidance (a navigation processing), to reference the update map data newly stored in the hard disk map database 242 (step S909) and to update the cache map data 251 of the memory unit 25 of FIG. 1, based on the referenced update map data (step S910). The navigation guidance section 265 then performs a navigation guidance processing, using the updated cache map data 251 and based on the cache map data 251 (step S911).

The map data update processing section 250 of FIG. 1 determines whether or not there is a data in the differential map data set 800, hard disk map database 242 of which has not yet been updated (step S912). If there is a not-yet-updated data of the differential map data set 800 (if Yes in step S912), the processing returns to step S908 and the not-yet-updated data of the differential map data set 800 is subjected to the processing of updating the hard disk map database 242.

On the other hand, if there is no not-yet-updated data of the differential map data set 800 (if No in step S912), the map data updating processing in the navigation device 2 is terminated.

Next is described in detail a differential map data acquisition processing in step S907 of FIG. 9.

Figure 10:
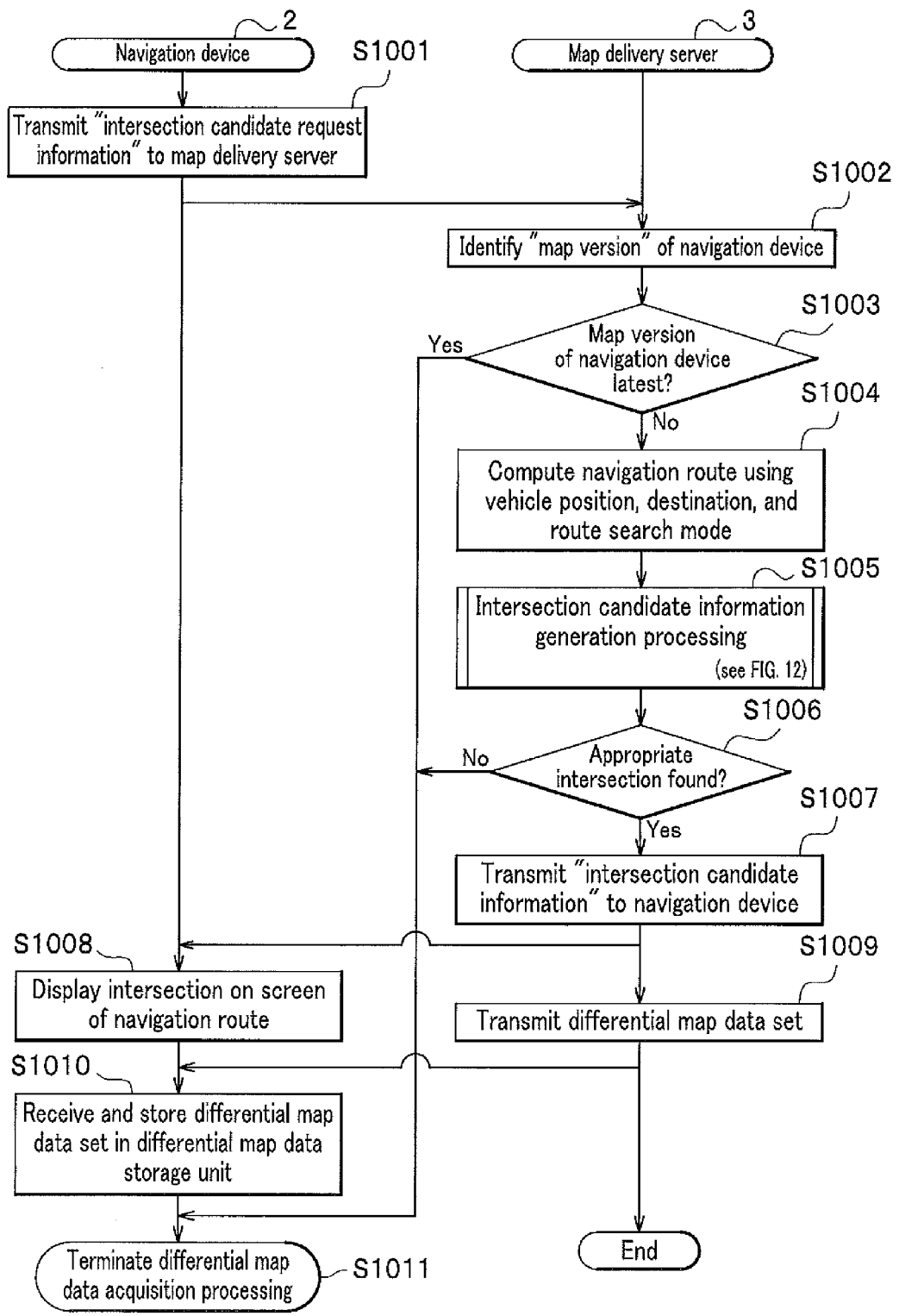
[FIG. 10] An explanatory diagram illustrating operations of the navigation system according to the embodiment.

FIG. 10 is a flowchart illustrating a flow of the differential map data acquisition processing in the navigation system 1 according to the embodiment.

The intersection candidate information acquisition section 210 of the navigation device 2 transmits the intersection candidate request information 500 to the map delivery server 3 (step S1001).

The map delivery server 3 identifies the map version 503 from the intersection candidate request information 500 (see FIG. 5) (step S1002) and determines whether or not the map version 503 of the navigation device 2 is identical to a latest map version held by the map delivery server 3 (step S1003). If the map version 503 of the navigation device 2 is identical to the latest map version held by the map delivery server 3 (if Yes in step S1003), the processing of acquiring the differential map data set 800 is terminated (step S1011).

Meanwhile, if the map version 503 of the navigation device 2 is not identical to the latest map version held by the map delivery server 3 (if No in step S1003), the navigation route confirmation section 311 (see FIG. 2) of the map delivery server 3 computes a navigation route, using the vehicle current position 501, the destination 502, and the route search mode 505 contained in the intersection candidate request information 500 (step S1004).

The map delivery server 3 performs an intersection candidate information generation processing for searching an intersection to which at least one end of a link on the navigation route of the navigation device 2 is connected (step S1005). Details of the intersection candidate information generation processing will be described later (see FIG. 12).

After completing the intersection candidate information generation processing, if no appropriate intersection is found (if No in step S1006), the processing of acquiring the differential map data set 800 is terminated (step S1011). On the other hand, if an appropriate intersection is found (if Yes in step S1006), the map delivery server 3 transmits the intersection candidate information 700 (see FIG. 7) to the navigation device 2 (step S1007).

After acquiring the intersection candidate information 700 from the map delivery server 3, the intersection candidate information acquisition section 210 (see FIG. 1) of the navigation device 2 displays the intersection based on the intersection candidate information 700, on a screen of the navigation route displayed on the display unit 21 (see FIG. 1) of the navigation device 2, under control of the navigation guidance section 265 (step S1008).

Figure 11:
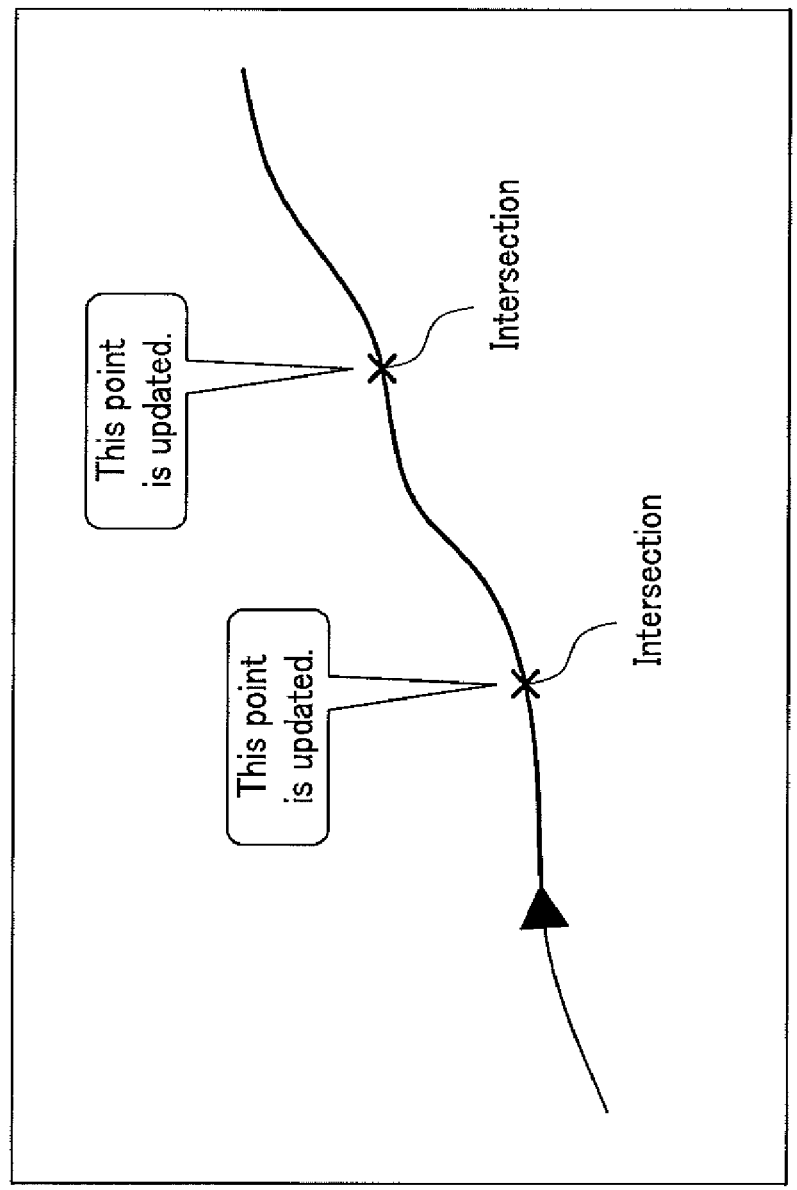
[FIG. 11] A diagram illustrating intersections displayed on a screen according to the embodiment.

FIG. 11 is a diagram illustrating an example in which the display unit 21 of the navigation device 2 displays intersections received from the map delivery server 3.

It is displayed to a user that a new intersection has been found on the route searched by the route search section 263 (see FIG. 1) of the navigation device 2, by updating the map data according to the processing by the navigation guidance section 265. Herein, as shown in FIG. 11, it is made known to the user that there is a navigation route to be updated, by showing a corresponding intersection with a cross mark or the like or by displaying a word balloon saying, for example, "This point is updated."

Referring back to FIG. 10, in step S1007, after transmitting the intersection candidate information 700 to the navigation device 2, the map delivery server 3 transmits all data of the differential map data set 800 which contain a point ID of the intersection in the intersection candidate information 700 to the navigation device 2 (step S1009). Upon receipt of the differential map data set 800, the navigation device 2 stores the received differential map data set 800 in the differential map data storage unit 241 (see FIG. 1) of the storage unit 24, under control of the differential map data acquisition section 220 (step S1010), and thus terminates the differential map data acquisition processing (step S1011).

Next is described the intersection candidate information generation processing in step S1005 of FIG. 10.

Figure 12:
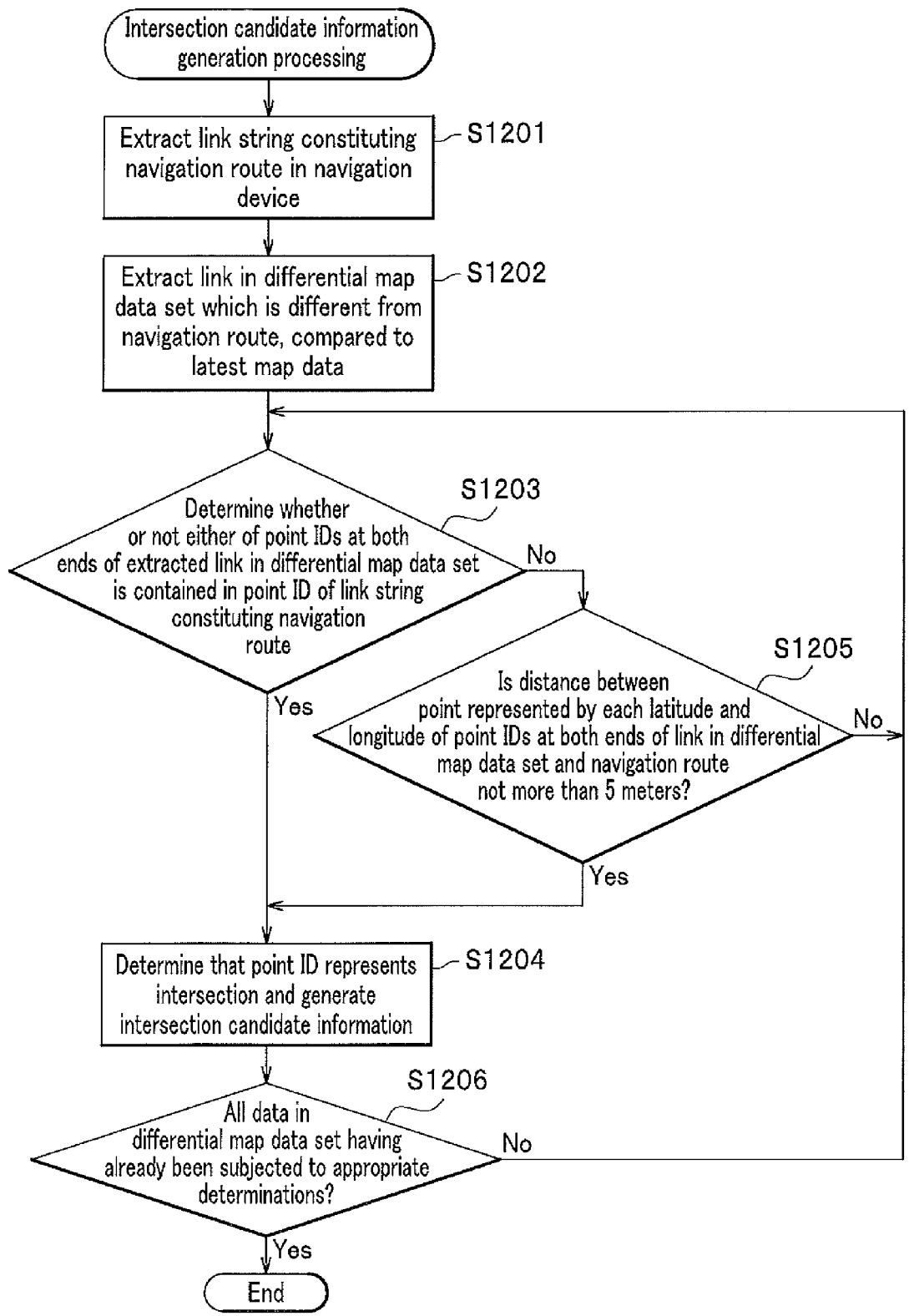
[FIG. 12] A flowchart illustrating an intersection candidate information generation processing performed by the map delivery server according to the embodiment.

FIG. 12 is a flowchart illustrating a processing of generating the intersection candidate information 700.

The difference extraction section 312 (see FIG. 2) of the map delivery server 3 extracts a link string which constitutes the navigation route in the navigation device 2 (step S1201). The difference extraction section 312 extracts a link in a data of the differential map data set 800 which is different from the navigation route in the navigation device 2, compared to the latest map version of the map data stored in the map data storage unit 30 of the map delivery server 3 (step S1202). The difference extraction section 312 (see FIG. 2) determines whether or not either of the point IDs at the both ends of the extracted link in the data of the differential map data set 800 is contained in a point ID of the link string constituting the navigation route (step S1203).

In step S1203, if the difference extraction section 312 determines that either of the point IDs of the link in the differential map data set 800 is contained in the navigation route of the navigation device 2 (if Yes in step S1203), the difference extraction section 312 determines that the point ID is an intersection on the navigation route and generates the intersection candidate information 700 (step S1204). On the other hand, also in step S1203, if the difference extraction section 312 determines that neither of the point IDs of the link in the differential map data set 800 is contained in the navigation route of the navigation device 2 (if No in step S1203), the difference extraction section 312 further determines whether or not distances between points represented by each latitude and longitude of the point IDs at the both ends of the link in the differential map data set 800 and the navigation route are not more than 5 meters (step S1205). If either of the distances is not more than 5 meters (if Yes in step S1205), the difference extraction section 312 determines that the points represent an intersection and generates the intersection candidate information 700 (step S1204). On the other hand, both of the distances are more than 5 meters (if No in step S1205), the difference extraction section 312 returns the processing to step S1203 so as to determine whether or not another link contains an intersection.

Herein, the reason why whether or not the distance between the points represented by latitude and longitude of the point IDs at the both ends of the link in the differential map data set 800 and the navigation route is not more than 5 meters is determined is that a margin of error of the latitude or the longitude of the point ID is tolerated. If the distance is not more than 5 meters, it is determined that the point is connected to the navigation route.

After generating the intersection candidate information 700 in step S1204, the difference extraction section 312 determines in step S1206 whether or not all links in the differential map data set 800 have already been subjected to the determinations (step S1206). If there is still a link in the differential map data set 800 which has not yet been subjected to the determination (if No in step S1206), the difference extraction section 312 returns the processing to step S1203 and continues the intersection candidate information generation processing. On the other hand, if all the links in the differential map data set 800 are determined to have already been subjected to the determination (if Yes in step S1206), the difference extraction section 312 terminates the intersection candidate information generation processing.

In the intersection candidate information generation processing, the intersection candidate information 700 including a "intersection" which is present on the navigation route of the navigation device 2 and a "link ID" corresponding thereto is generated as shown in FIG. 7.

Figure 13:
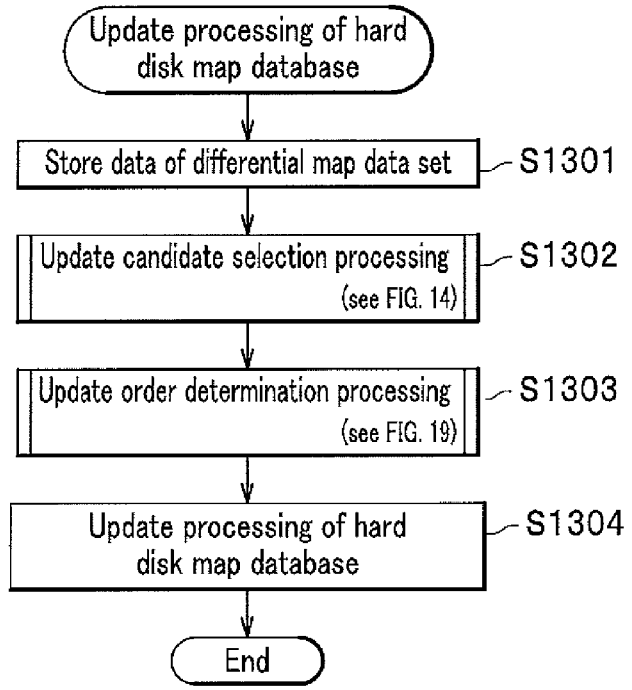
[FIG. 13] A flowchart illustrating an update processing of a hard disk map database according to the embodiment.

Next is described an update processing of the hard disk map database 242 (see FIG. 1) in step S908 of FIG. 9. FIG. 13 is a flowchart illustrating the update processing of the hard disk map database 242 using the differential map data set 800 stored in the differential map data storage unit 241 of the navigation device 2.

The map data update processing section 250 (see FIG. 1) of the navigation device 2 receives the differential map data set 800 (see FIG. 8) from the differential map data acquisition section 220 and stores the differential map data set 800 in the differential map data storage unit 241 (see FIG. 1) (step S1301).

In step S1301, if the map data update processing section 250 determines that the differential map data set 800 has already been stored, an update candidate selection processing is performed in which an update map data which is a data in the differential map data set 800 and is updatable in time by the navigation device 2 before a corresponding arrival time, is selected, from among data in the differential map data set 800 stored in the differential map data storage unit 241 (step S1302). A specific flow of the update candidate selection processing will be described later (see FIG. 14).

An update order determination processing is then performed in which an order of updating the update map data selected in step S1302 is determined such that the update map data is arranged in order of increasing arrival times at an intersection based on that the shorter the distance between the intersection and the navigation device 2, the earlier the arrival time (step S1303). A specific flow of the update order determination processing will be described later (see FIG. 19).

An update map data which has been determined to be updated first according to the update order determined in step S1303 is subjected to an update processing of the hard disk map database 242 under control of the map data update processing section 250 (step S1304).

If the map data update processing section 250 completes the update of the hard disk map database 242 in step S1304, the map data update processing section 250 terminates the update processing of the hard disk map database 242.

Figure 14:
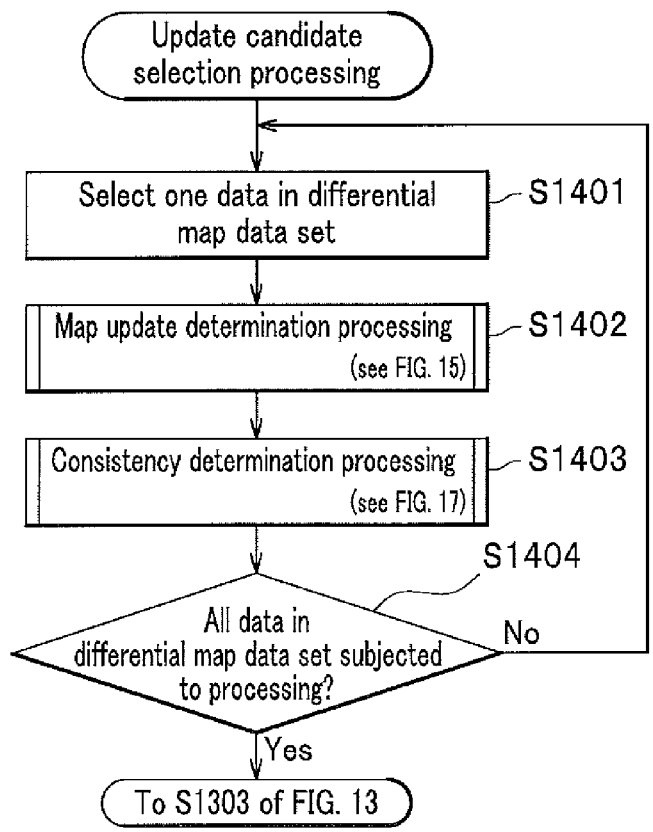
[FIG. 14] A flowchart illustrating an update candidate selection processing according to the embodiment.

Next is described the update candidate selection processing in step S1302 of FIG. 13. FIG. 14 is a flowchart illustrating the update candidate selection processing performed by the update map data selection section 230 (see FIG. 1) of the navigation device 2.

A single data from among all data in the differential map data set 800 stored in the differential map data storage unit 241 is selected (step S1401). Next is performed a map update determination processing in which it is determined whether or not there is enough time left for the navigation device 2 to perform navigation operations, even after the selected data in the differential map data set 800 is updated (step S1402). In other words, there may be a case where an update of a data in the differential map data set 800 is not yet completed when a vehicle reaches an intersection corresponding to the data, and the vehicle thus passes through the intersection when the update is completed. In this case, the map update determination section 231 (see FIG. 1) determines that the update is not necessary. On the other hand, if the update is estimated to be completed before the vehicle reaches the intersection, the determination section 231 performs a processing of selecting the data in the differential map data set 800, as an update map data (to be described hereinafter, see FIG. 15).

Next is performed a consistency determination processing in step S1403. The consistency determination section 232 (see FIG. 1) determines whether or not point IDs at both ends of a link contained in a data in the differential map data set 800 is connected to links on the search route (to be described hereinafter, see FIG. 17). That is, if a road has a new intersection but is a dead end, a route using the road is excluded from an appropriate navigation route. Therefore, consistency on whether or not a road having a new intersection found in the updated differential map data set 800 is connected to the route navigation searched by the navigation device 2 is determined (step S1403).

It is then determined whether or not all data in the differential map data set 800 are subjected to the processing (step S1404). If there is a data not yet being subjected to the processing in the differential map data set 800 (if No in step S1404), the update candidate selection processing of the differential map data set 800 is continued, returning to step S1401. On the other hand, if all of the data in the differential map data set 800 has already been subjected to the processing (if Yes in step S1404), the processing advances to the update order determination processing in step S1303 of FIG. 13.

This makes it possible to narrow down a candidate data to be updated from among the data in the differential map data set 800 acquired by the navigation device 2 from the map delivery server 3 before the update processing of the hard disk map database 242 shown in FIG. 13 is performed. Load of the update processing of the hard disk map database 242 is thus reduced. As a result, the update processing of the differential map data set 800 is speeded up, to thereby allow processings of a route search and a navigation guidance using the latest map data to be quickly started.

Next is described in detail a map update determination processing in step S1402 of FIG. 14.

Figure 15:
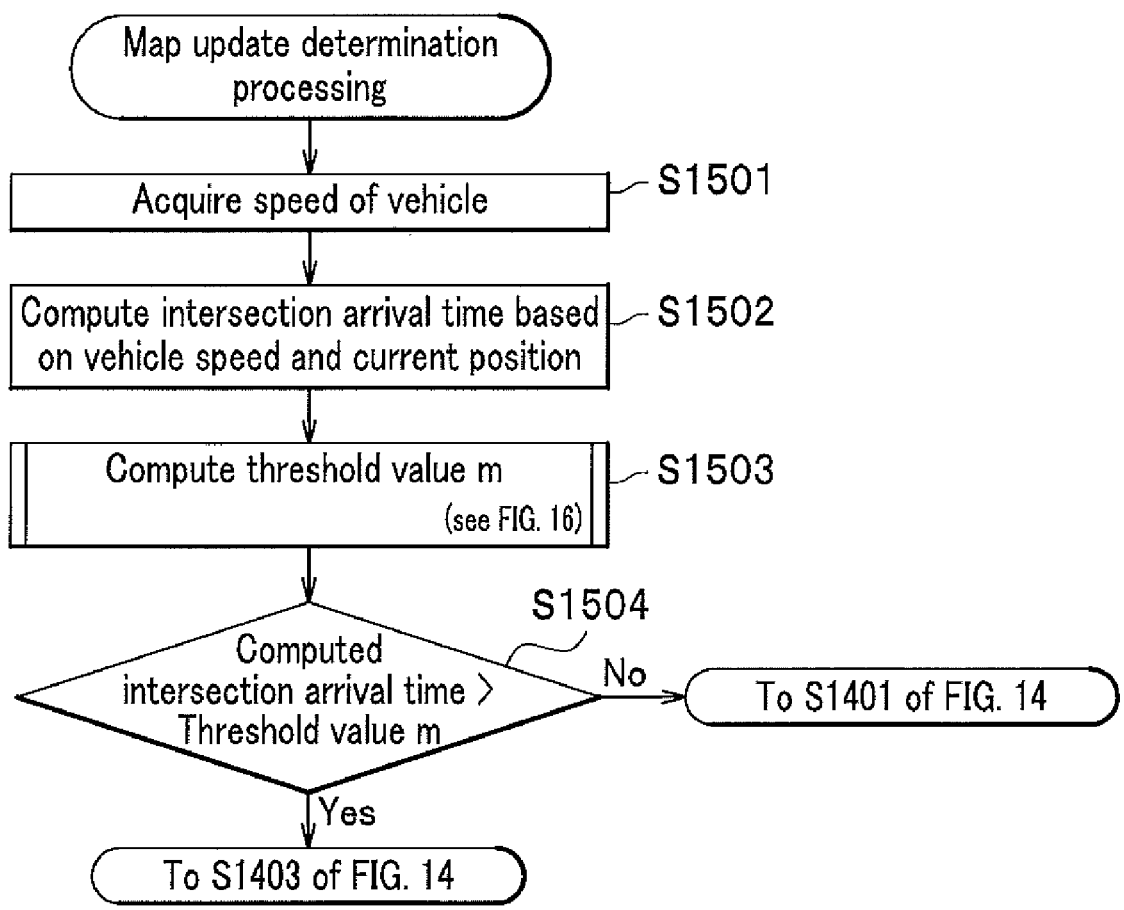
[FIG. 15] A flowchart illustrating a map update determination processing according to the embodiment.

FIG. 15 is a flowchart illustrating a flow of the map update determination performed by the map update determination section 231 of the navigation device 2.

The map update determination section 231 (see FIG. 1) acquires a speed of the vehicle from the vehicle speed detection section 264 (see FIG. 1) (step S1501). An arrival time from a current position (a position of the vehicle) to the intersection in the update map data is computed from the vehicle speed and the current position of the navigation device 2 (step S1502). A threshold value m is computed based on a time required for an update of the hard disk map database 242 or the like (step S1503). The computed arrival time from the current position to the intersection is compared with the threshold value m so as to determine whether or not the intersection arrival time is longer than the threshold value m (step S1504).

If the intersection arrival time is longer than the threshold value m (if Yes in step S1504), the processing advances to the consistency determination processing in step S1403 of FIG. 14. On the other hand, if the intersection arrival time is equal to or shorter than the threshold value m (if No in step S1504), the differential map data set 800 is not updated because of insufficient time for the updating. The processing returns to step S1401 of FIG. 14 and the determination processing of another data in the differential map data set 800 is performed.

Next is described how to compute the threshold value m in step S1503 of FIG. 15.

The threshold value m is expressed as follows: threshold value m=(maximum route search completion time m1)+(screen update time m2)+(hard disk map database update time m3)+(cache map data update time m4).

Figure 16:
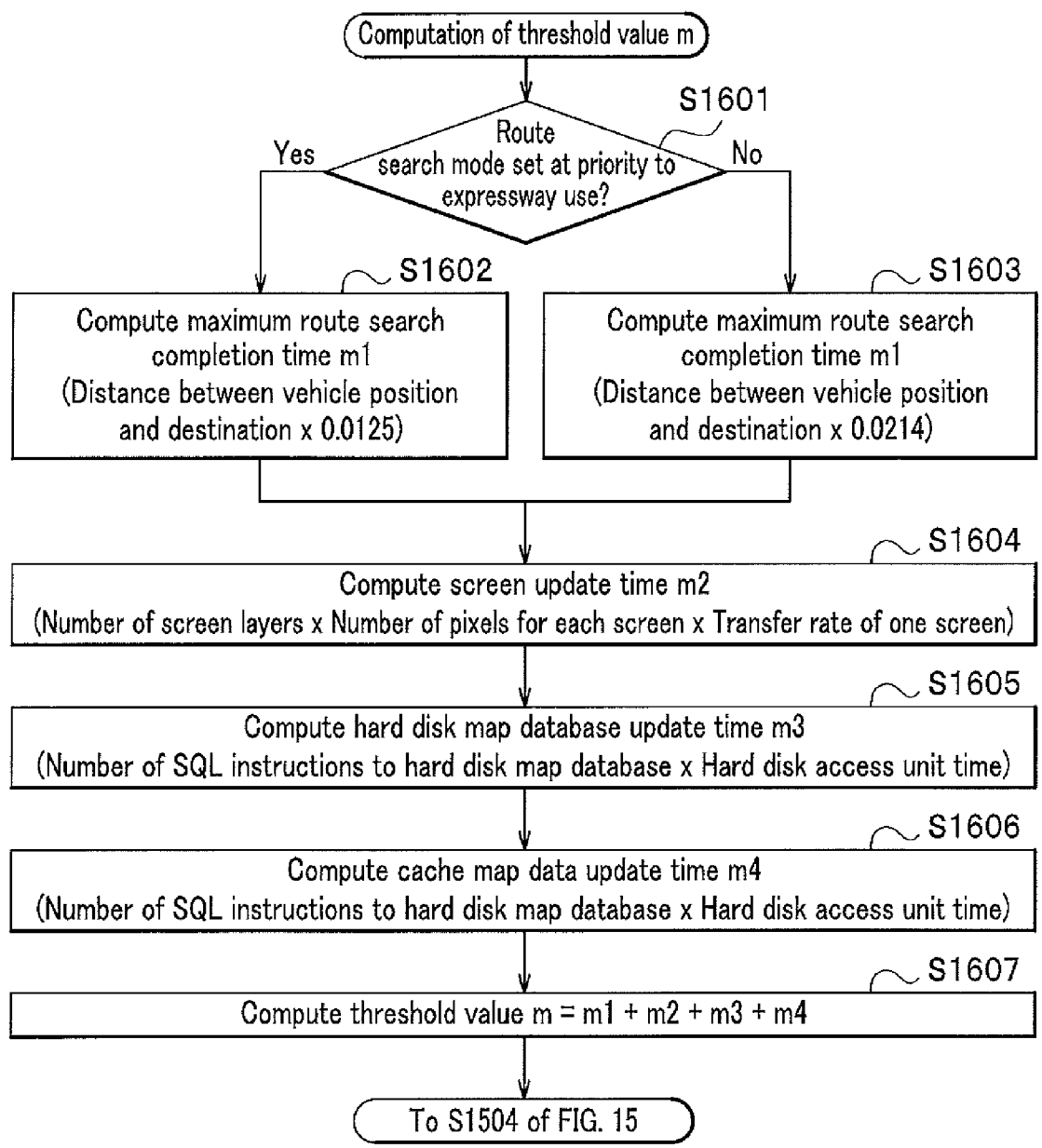
[FIG. 16] A flowchart illustrating how to compute a threshold value m according to the embodiment.

FIG. 16 is a flowchart illustrating how to compute the threshold value m according to the embodiment. The map update determination section 231 (see FIG. 1) determines whether or not the route search mode 505 is set at priority to a use of an expressway in a setting in the route search section 263 (step S1601). If the priority to expressway use is set (if Yes in step S1601), the maximum route search completion time is computed based on the expressway use (step S1602). On the other hand, if the priority to expressway use is not set, for example, priority to a use of an ordinary road is set (if No in step S1601), the maximum route search completion time is computed with an assumption that a route using an ordinary road is more complicated than a route using an expressway (step S1603).

Herein, the "maximum route search completion times m1" in step S1602 and step S1603 are obtained by multiplying distances between vehicle current positions and destinations by predetermined values ($\alpha$, $\beta$), respectively. If the priority is given to an expressway, the predetermined value $\alpha$ is, for example, a 0.0125 second/km using an actual measured value. If the priority is given to an ordinary road, the predetermined value $\beta$ is, for example, a 0.0214 second/km.

In step S1604, the "screen update time m2" is computed. The screen update time m2 is obtained by multiplying the number of screen layers, the number of pixels for each screen, and a transfer rate of one screen.

In step S1605, the "hard disk map database update time m3" is computed. The hard disk map database update time m3 is obtained by multiplying the number of SQL instructions to the hard disk map database 242 by a hard disk access unit time (for example, a 0.07 second/1 SQL instruction).

In step S1606, the "cache map data update time m4" is computed. The cache map data update time m4 is obtained by multiplying the number of SQL instructions to the hard disk map database 242 by a hard disk access unit time (for example, a 0.07 second/1 SQL instruction).

The map update determination section 231 then computes the threshold value m by summing up values m1, m2, m3, and m4 computed in respective steps. This makes it possible to update a map on a more timely basis for a user because an order of the updating can be determined with a higher accuracy by using not only the vehicle current position and the vehicle speed but also processing performance of the navigation device 2 or various navigation information set by the user.

Figure 17:
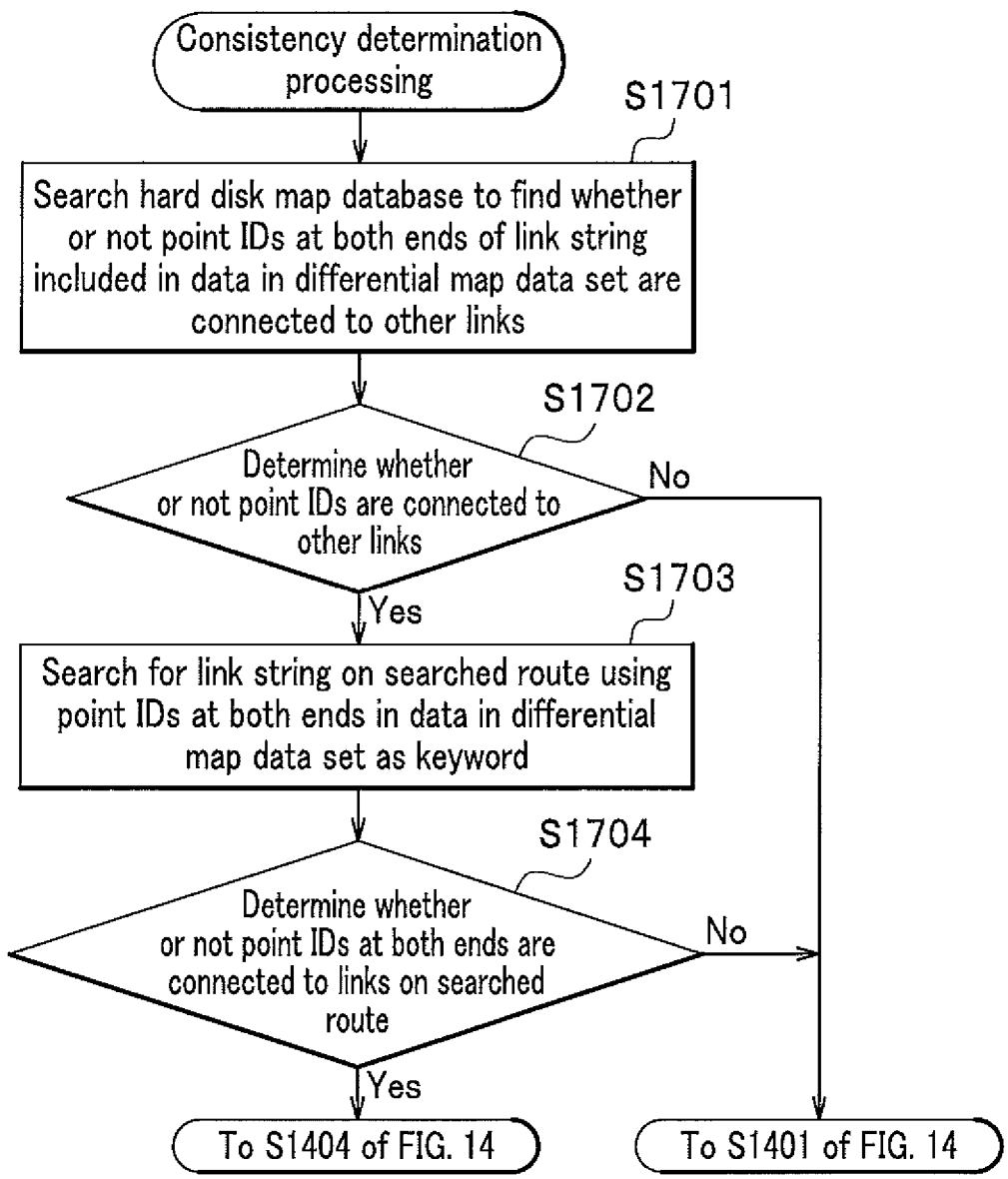
[FIG. 17] A flowchart illustrating a consistency determination processing according to the embodiment.
Figure 18:
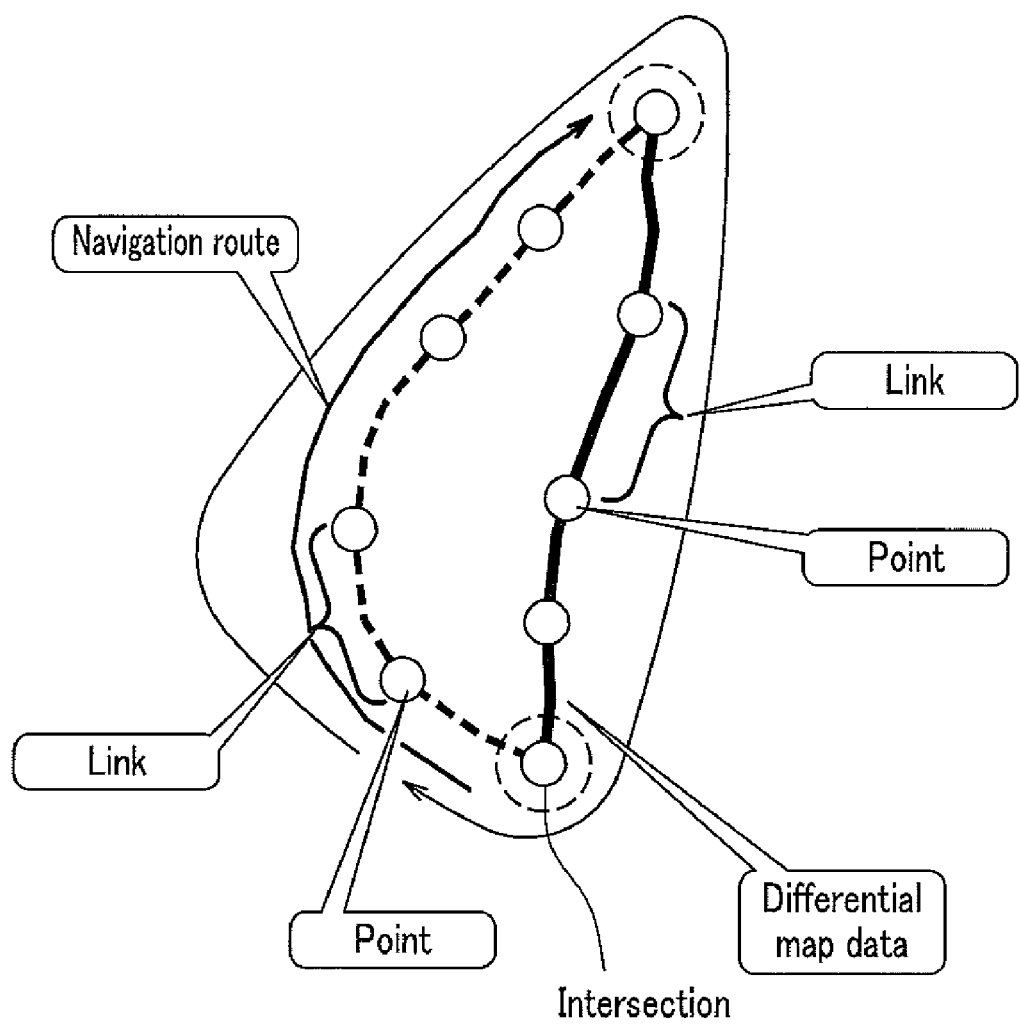
[FIG. 18] A conceptual diagram illustrating a consistency determination processing according to the embodiment.

Next is described in detail the consistency determination processing in step S1403 of FIG. 14 with reference to FIG. 17 and FIG. 18.

FIG. 17 is a flowchart illustrating a flow of the processing performed by the consistency determination section 232 of the navigation device 2 in this embodiment. FIG. 18 is a conceptual diagram illustrating a consistency determination in this embodiment.

In FIG. 17, the consistency determination section 232 (see FIG. 1) searches the hard disk map database 242 to find whether or not point IDs at both ends of a link string included in a data in the differential map data set 800 are connected to other links (step S1701).

After step S1701, the consistency determination section 232 determines whether or not the point IDs are connected to other links (step S1702). If the point IDs in the data are not determined to be connected to other links (if No in step S1702), the consistency determination section 232 returns the processing to step S1401 of FIG. 14 because there is no need to update the data in the differential map data set 800 and continues the determination processing of another data in the differential map data set 800.

On the other hand, if the point IDs are determined to be connected to other links (if Yes in step S1702), the processing advances to step S1703.

In step S1703, the consistency determination section 232 searches for a link string on the searched route, in a hard disk map using the point IDs at both ends in the data in the differential map data set 800 as keywords.

The consistency determination section 232 then determines whether or not the point IDs at the both ends are connected to inks on the searched route (step S1704). If the point IDs are not determined to be connected to links on the searched route (if No in step S1704), it means that the link string is not connected to the searched route searched by the navigation device 2 at the both ends, and thus, the consistency determination section 232 determines that there is no need to update a corresponding map data. The consistency determination section 232 returns the processing to step S1401 of FIG. 14 and performs the determination processing of another data in the differential map data set 800.

On the other hand, if the point IDs are determined to be connected to links on the searched route (if Yes in step S1704), the processing advances to step S1404 of FIG. 14.

FIG. 18 is a diagram for explaining that a data in the differential map data set 800 is connected to a navigation route of the navigation device 2 at both ends of a link string. As shown in FIG. 18, there is a searched route which takes a route different from the navigation route but has two intersections on the navigation route. Point IDs at both ends of a data in the differential map data set 800 corresponding to the searched route are thus connected to the navigation route. It is then determined that links of the searched route are connected to a link string of the data in the differential map data set 800. On the other hand, even if one of the point IDs of the searched route representing an intersection is shared by the navigation route, the other point ID may not be connected to the navigation route. In this case, the searched route is not determined to lead to an appropriate destination. Therefore, the point IDs at both ends of a data in the differential map data set 800 need to be connected to the navigation route.

As described above, the consistency determination processing makes it possible to prevent a data in the differential map data set 800 from being unnecessarily updated. After determining update necessity of a data in the differential map data set 800, only a data required to be updated is subjected to the update processing.

Figure 19:
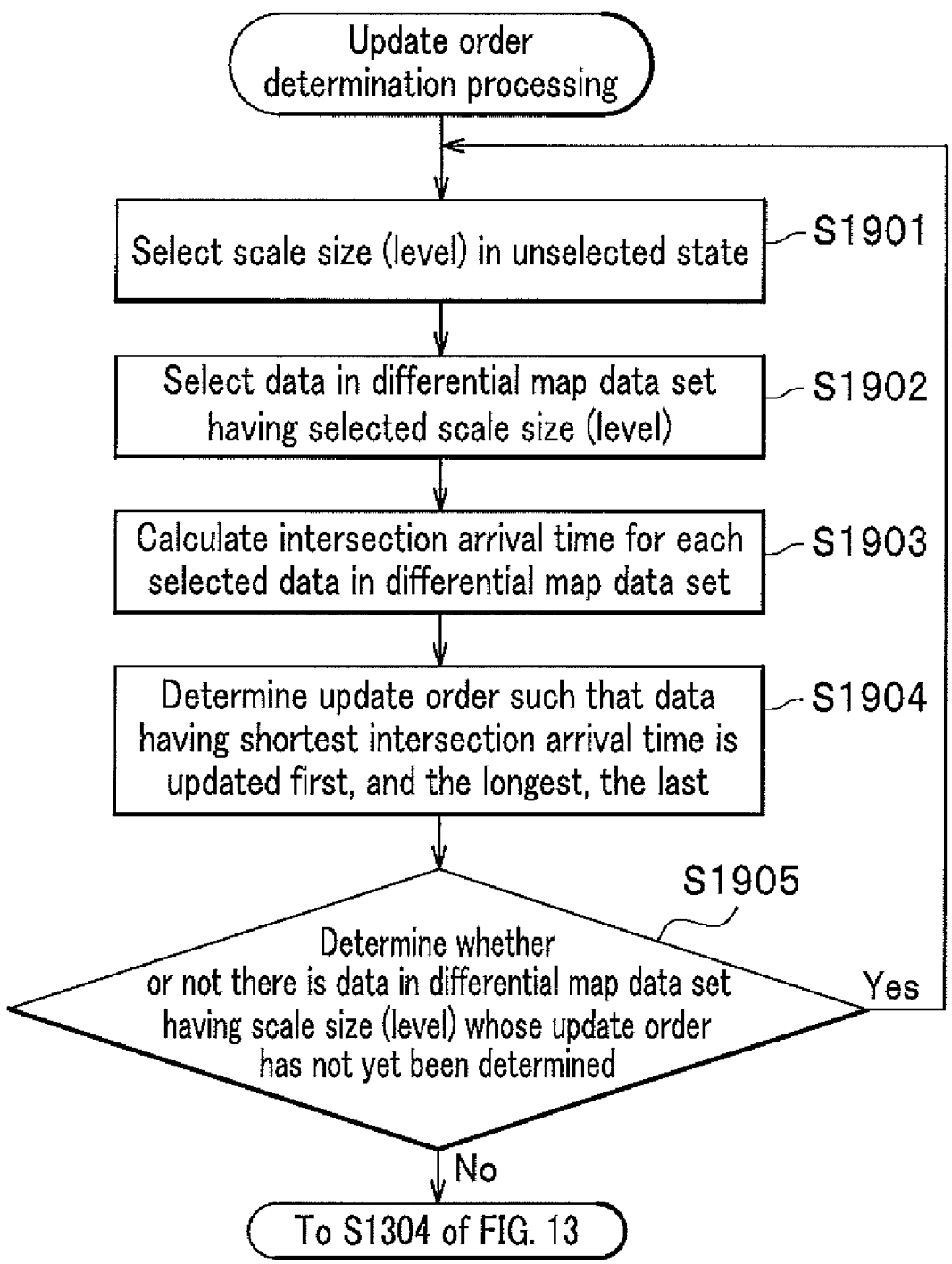
[FIG. 19] A flowchart illustrating an update order determination processing according to the embodiment.

Next is described the update order determination processing in step S1303 of FIG. 13 with reference to FIG. 19. FIG. 19 is a flowchart illustrating a flow of a processing of determining an update order of a data which is determined by the update order determination section 240 (see FIG. 1) as an update map data required to be updated, from among data in the differential map data set 800.

A scale size (a level) which is in an unselected state is selected from one or more scale sizes (levels) by which contents of map data are managed according to degrees of zooming a map (step S1901). The selection is made in an order from the largest scale size, for example, the "overview level" to the "detailed level", which are identified according to a link string ID in the update map data.

Then, a data in the differential map data set 800 having the scale size (level) selected in step S1901 is selected (step S1902).

A time required for arriving at an intersection from a current position is calculated for each selected data in the differential map data set 800 (step S1903). Note that, in this step, the arrival time can be substituted by calculation results which have already been calculated in the map update determination processing (see FIG. 15) and stored in the memory unit 25 (see FIG. 1).

The update order determination section 240 determines an update order such that an update map data having the shortest calculated intersection arrival time (that is, arriving at the intersection first) is subjected to the update processing first, and the longest, the last (step S1904).

Next is determined whether or not there is a data in the differential map data set 800 having a scale size (level) in which an update order of data has not yet been determined (step S1905). If there is a data in the differential map data set 800 having a scale size (level) in which the update order has not yet been determined (if Yes in step S1905), the processing returns to step S1901. Then, a data in the differential map data set 800 having the second largest scale size (level) is selected and is subjected to the update order determination processing in step S1902 and thereafter.

On the other hand, if there is no data in the differential map data set 800 having a scale size (level) in which the update order has not yet been determined (if No in step S1905), the update order determination processing of the differential map data set 800 is terminated, and the processing advances to step S1304 of FIG. 13.

Note that the map data update processing section 250 performs necessary update of the cache map data 251 (steps S909 to S910 of FIG. 9), in response to the update of the hard disk map database 242 with respect to a data in the differential map data set 800.

This makes it possible to update data in the differential map data set 800 in order of earlier necessity of a route search, while ensuring consistency, thus allowing the navigation guidance to be conducted based on the updated differential map data set 800.

Next is described a variation of the embodiment of the present invention.

Figure 20:
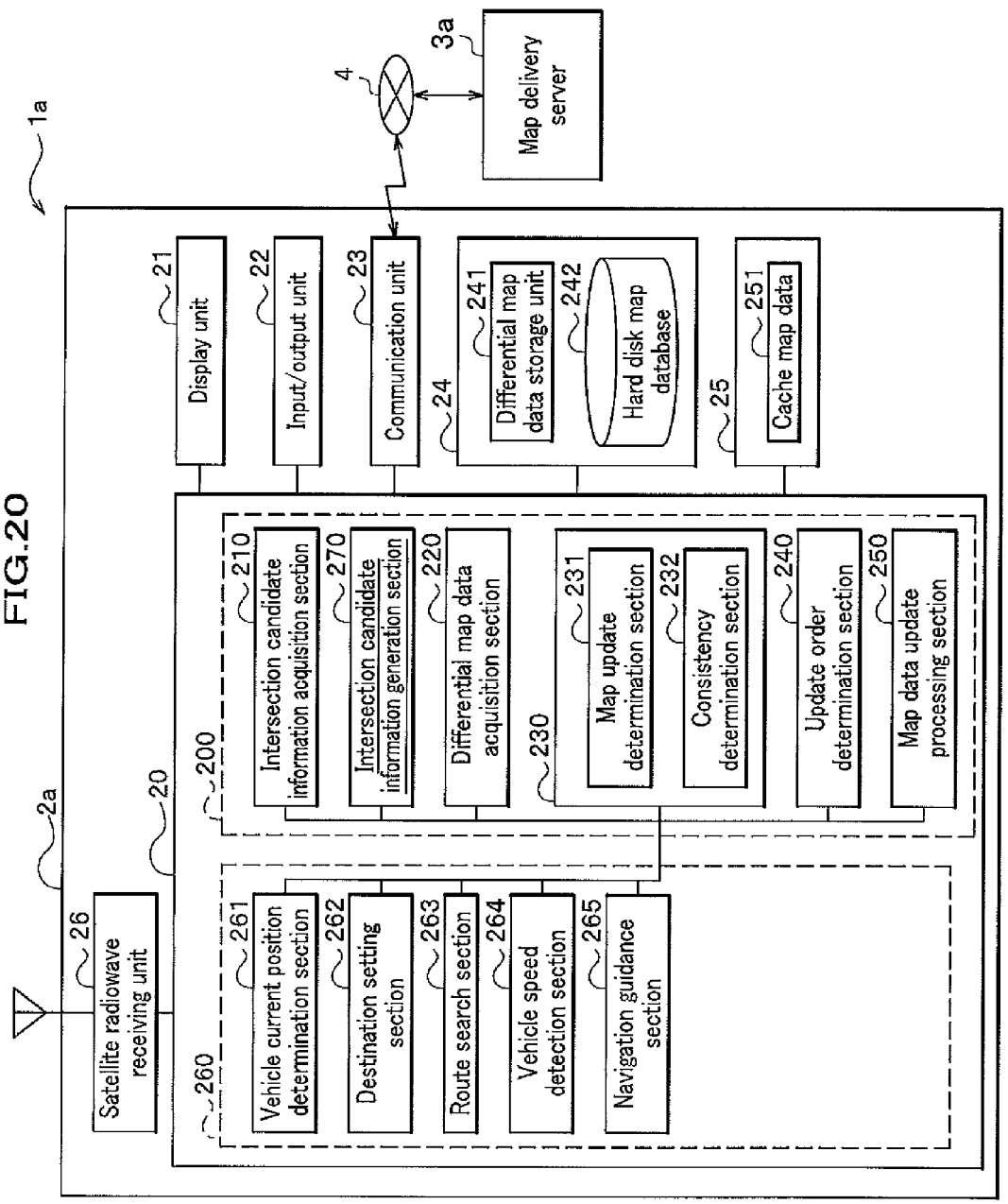
[FIG. 20] A functional block diagram illustrating a configuration of a navigation system according to a variation of the embodiment of the present invention.

FIG. 20 is a diagram illustrating a configuration example of a navigation system 1a according to the variation. As shown in FIG. 20, in the variation, an intersection candidate information generation section 270 is newly added to the map data update section 200, compared to the configuration of the navigation device 2 of FIG. 1. The same reference numerals are herein used for components having the substantially same functions as those in the navigation system 1 of FIG. 1, and description thereof is omitted herefrom.

The intersection candidate information generation section 270 extracts an intersection on a navigation route, based on the differential map data set 800 obtained by the differential map data acquisition section 220 and the navigation route searched by the route search section 263. This makes it possible to extract an intersection in a navigation device 2a, unlike in the embodiment of the present invention in which an intersection is extracted in a map delivery server 3.

Figure 21:
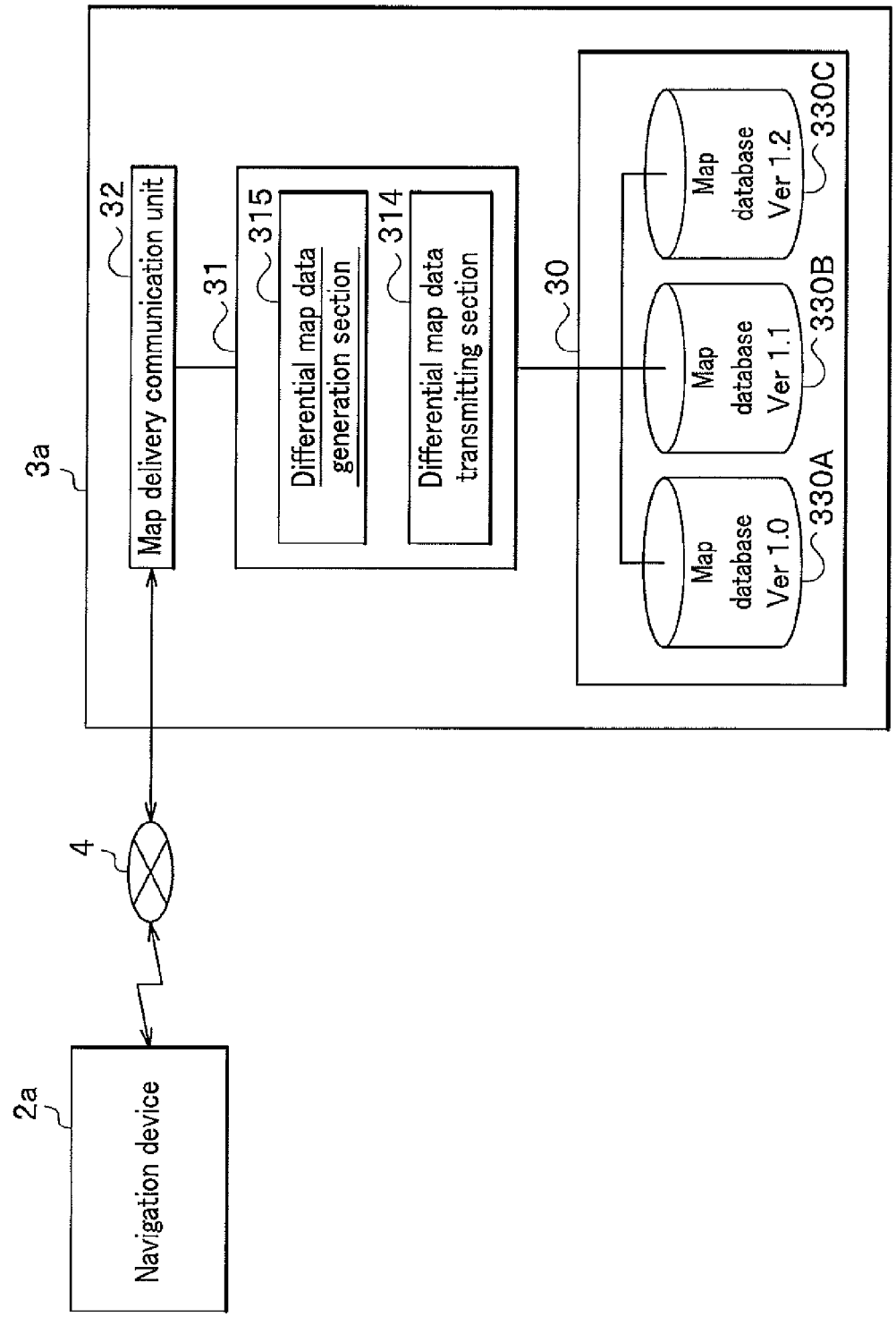
[FIG. 21] A functional block diagram illustrating a configuration of a map delivery server according to the variation.

Next is described a map delivery server 3a according to the variation of the embodiment of the present invention. FIG. 21 is a functional block diagram illustrating the map delivery server 3a according to the variation of the present invention. The map delivery server 3a is different from the map delivery server 3 of FIG. 2 in that the map delivery server 3a does not create the intersection candidate information 700 and therefore does not have the intersection candidate information generation section 310 and the intersection candidate information transmitting section 313, and on the other hand, the map delivery server 3 has the both. Meanwhile, the map delivery server 3a has a differential map data generation section 315.

The differential map data generation section 315 identifies the map version 503 of the navigation device 2a from the intersection candidate request information 500 obtained from the navigation device 2a. The differential map data generation section 315 also sets a prescribed circular region from the received vehicle current position 501 and destination 502, references a map data within the region, and thereby extracts the differential map data set 800.

Figure 22:
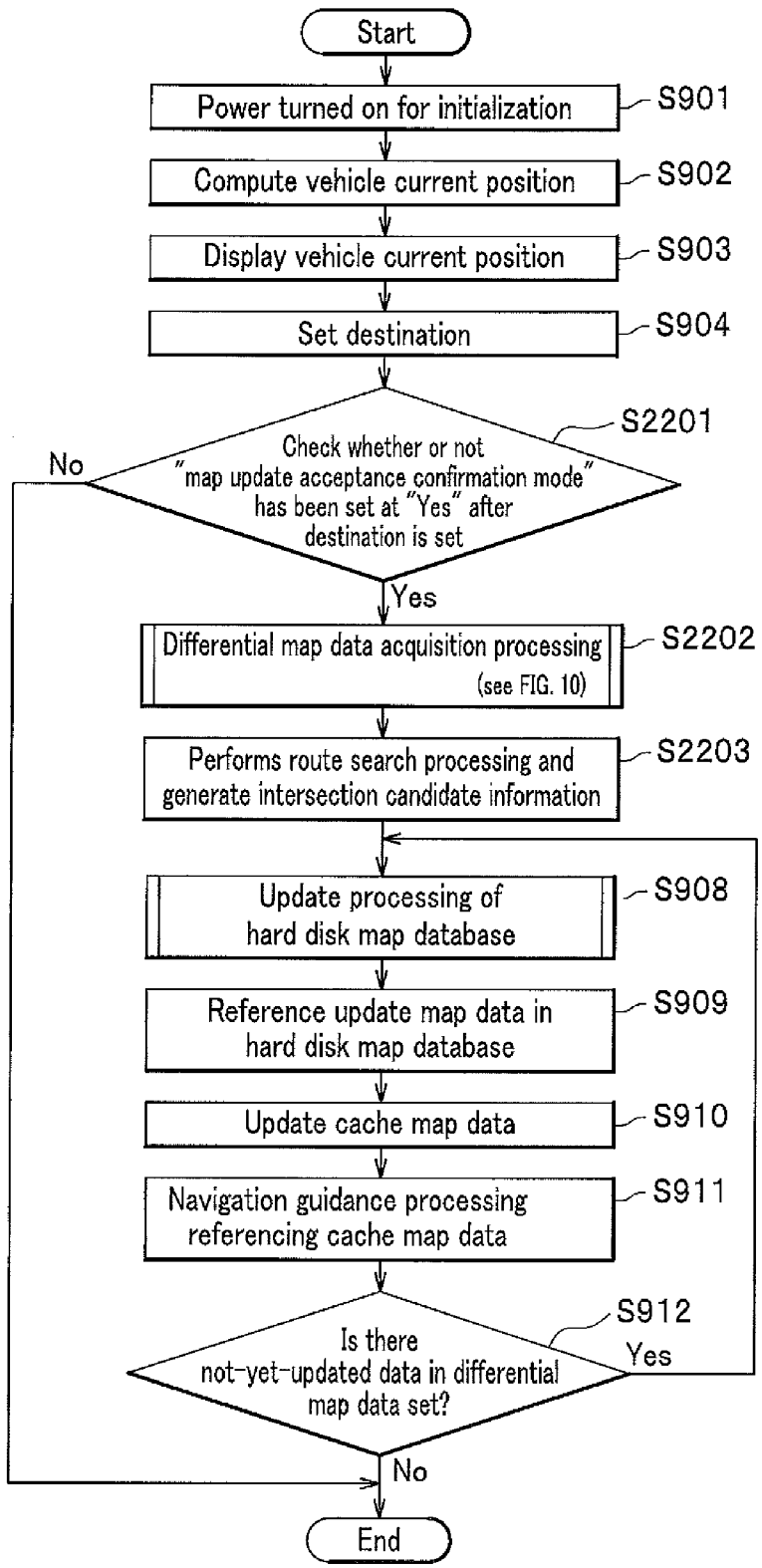
[FIG. 22] A flowchart illustrating operations of a navigation device according to the variation.

FIG. 22 is a flowchart illustrating operations of the navigation device 2a according to the variation of the embodiment of the present invention. The same step names are used for steps having the substantially same operations as those in the navigation device 2 of FIG. 9, and description thereof is omitted herefrom (namely, descriptions of steps S901 to S904 and steps S908 to S912 are omitted).

A processing flow of the variation of FIG. 22 is different from that of the embodiment of FIG. 9 is as follows. In FIG. 9, after the route search processing (step S905) is completed, the differential map data acquisition processing is performed to the map delivery server 3. On the other hand, in the variation of FIG. 22, after setting of a destination is completed, the differential map data acquisition processing is performed to the map delivery server 3a without performing the route search processing. Further, in the variation, the intersection candidate information 700 is generated in the navigation device 2a.

In FIG. 22, the differential map data acquisition section 220 checks, after the setting of a destination, whether or not the "map update acceptance confirmation mode" has been set at "Yes" (step S2201). If the mode has been set at "No" (if No in step S2201), the update processing of the map data is not performed, and a map data existing in the navigation device 2a is used for performing a navigation processing. On the other hand, if the mode has been set at "Yes" (if Yes in step S2201), the differential map data acquisition processing is performed (step S2202). After the differential map data set 800 is acquired from the map delivery server 3a, the route search section 263 performs the route search processing, and the intersection candidate information generation section 270 generates the intersection candidate information 700 (step S2203). Then, the same steps as those in the embodiment are performed. That is, the hard disk map database 242 and the cache map data 251 are updated, based on which an appropriate navigation processing is performed.

Figure 23:
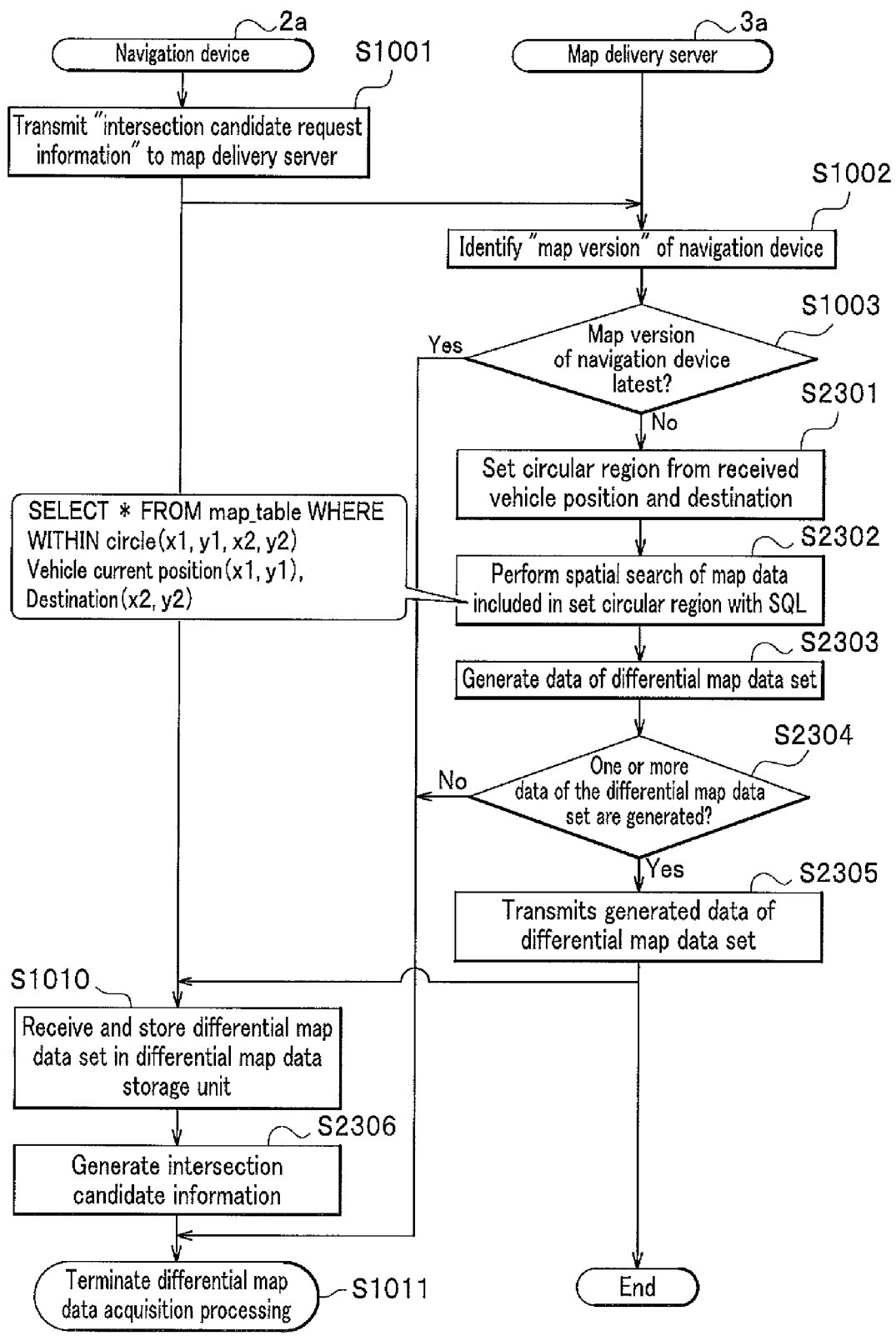
[FIG. 23] An explanatory diagram illustrating operations of a navigation system according to the variation.

Next is described a differential map data acquisition processing according to the variation of the embodiment of the present invention. FIG. 23 is a flowchart illustrating a flow of the differential map data acquisition processing of the navigation system 1a according to the variation.

The intersection candidate information acquisition section 210 of the navigation device 2a transmits the intersection candidate request information 500 to the map delivery server 3a (step S1001). Then, similarly to the processing shown in FIG. 10, the map delivery server 3a identifies the map version 503 of the navigation device 2a from the intersection candidate request information 500 (step S1002) and determines whether or not the map version 503 of the navigation device 2a is the latest map version (step S1003).

If the map version 503 of the navigation device 2a is not the latest map version (if No in step S1003), a prescribed circular region is set which is determined from the received vehicle current position 501 and destination 502 under control of the differential map data generation section 315 (step S2301). A map data included in the set circular region is subjected to a spatial search, using a search processing with SQL (step S2302). An example of a statement of the spatial search according to the variation is shown in FIG. 23 beside step S2302. In this variation, the spatial search is performed in the circular region. In addition to the circular region, however, an ellipsoidal region or a rectangular region may be set. This makes it possible for the navigation device 2a to acquire only a portion of the differential map data set 800 as much as needed within a region on the map specified by the vehicle current position 501 and the destination 502, from the map delivery server 3a. Thus, unnecessary communication costs can be saved, and a time required for the update processing of the hard disk map database 242 with respect to the obtained differential map data set 800 can also be reduced.

The differential map data generation section 315 generates, if any, a data of the differential map data set 800 which has a portion different from the latest map version, with respect to the map data subjected to the spatial search, using the map version 503 of the navigation device 2a and the map database 330 in the latest map version (step S2303).

The differential map data generation section 315 determines whether or not one or more data of the differential map data set 800 are generated (step S2304). If no data of the differential map data set 800 is generated (if No in step S2304), the differential map data generation section 315 terminates the differential map data acquisition processing. Meanwhile, if one or more data of the differential map data set 800 is generated (if Yes in step S2304), the differential map data generation section 315 transmits the generated data of the differential map data set 800 to the navigation device 2a (step S2305).

In the navigation device 2a, the differential map data acquisition section 220 acquires the transmitted data of the differential map data set 800, and the differential map data storage unit 241 of the storage unit 24 stores therein the acquired data of the differential map data set 800 (step S1010).

In the navigation device 2a, the route search section 263 performs a route computation. The intersection candidate information generation section 270 generates the intersection candidate information 700 by performing a processing similar to the intersection candidate information generation processing shown in FIG. 12 (step S2306).

As described above, in the navigation device, navigation method and navigation system according to the embodiment of the present invention, a data in the differential map data set 800 can be updated in order of shorter to longer arrival times at an intersection. Further, navigation guidance can be performed based on the updated differential map data set 800.

Next is described a differential map data acquisition processing according to another variation of the embodiment of the present invention with reference to FIG. 10.

The intersection candidate information acquisition section 210 of the navigation device 2 transmits the intersection candidate request information 500 (see FIG. 5) to the map delivery server 3 (step S1001).

The map delivery server 3 identifies a route search section identifier 5055 and the map version 503 held in the route search mode 505, from the intersection candidate request information 500 received from the navigation device 2 (step S1002), determines whether or not the map version 503 of the navigation device 2 is the latest map version held by the map delivery server 3, and also identifies a route search application used in the navigation device 2 (step S1003). The route search section identifier 5055 is herein used on an assumption that uniqueness of the route search section 206 is guaranteed at least between the map delivery server 3 and the navigation device 2. Then, if the map version 503 of the navigation device 2 is the latest map version held by the map delivery server 3 (if Yes in step S1003), the acquisition processing of a data of the differential map data set 800 is terminated (step S1011).

On the other hand, if the map version 503 of the navigation device 2 is not the latest map version held by the map delivery server 3 (if No in step S1003), the navigation route confirmation section 311 (see FIG. 2) of the map delivery server 3 selects an optimal route search section for differential map data acquisition 3115 identified by the route search section identifier 5055, from a route search section group for differential map data acquisition 3113 which is supplied from a manufacturer of the navigation device 2 and is held by the map delivery server 3, using the vehicle current position 501, destination 502, and route search mode 505 each included in the received intersection candidate request information 500, based on which the navigation route confirmation section 311 computes a navigation route (step S1004). This processing makes it possible for the map delivery server 3 to suitably select a different map and to effectively deliver the different map, based on different navigation routes to be possibly provided by different types of the navigation device 2.

Next is described a differential map data acquisition processing according to a yet another variation of the embodiment of the present invention with reference to FIG. 10.

The intersection candidate information acquisition section 210 of the navigation device 2 transmits the intersection candidate request information 500 (see FIG. 5) to the map delivery server 3 (step S1001).

The map delivery server 3 identifies a data on a navigation route (see FIG. 4) held in the route search mode 505 and the map version 503 (step S1002), from the intersection candidate request information 500 and determines whether or not the map version 503 of the navigation device 2 is the latest map version held by the map delivery server 3 (step S1003). If the map version 503 of the navigation device 2 is the latest map version held by the map delivery server 3 (if Yes in step S1003), the acquisition processing of the differential map data set 800 is terminated (step S1011).

On the other hand, if the map version 503 of the navigation device 2 is not the latest map version held by the map delivery server 3 (if No in step S1003), the navigation route confirmation section 311 (see FIG. 2) of the map delivery server 3 selects the vehicle current position 501, destination 502, route search mode 505, and navigation route data (see FIG. 4) included in the received intersection candidate request information 500 and takes the selected data as a navigation route (step S1004). This processing makes it possible for the map delivery server 3 to efficiently select a differential map and to effectively deliver the different map, based on a navigation route computed in the navigation device 2 without being negatively affected by different navigation routes to be possibly provided by different models of the navigation device 2.

DESCRIPTION OF REFERENCE CHARACTERS 1 navigation system
2 navigation device
3 map delivery server
4 communication line
20 control unit
21 display unit
22 input/output unit
23 communication unit
24 storage unit
25 memory unit
26 satellite radiowave receiving unit
30 map data storage unit
31 map delivery control unit
32 map delivery communication unit
200 map data update section
210 intersection candidate information acquisition section
220 differential map data acquisition section
230 update map data selection section
231 map update determination section
232 consistency determination section
240 update order determination section
241 differential map data storage unit
242 hard disk map database
250 map data update processing section
251 cache map data
260 navigation control section
261 vehicle current position determination section
262 destination setting section (setting section)
263 route search section
264 vehicle speed detection section
265 navigation guidance section
270, 310 intersection candidate information generation section
311 navigation route confirmation section
312 difference extraction section
313 intersection candidate information transmitting section
314 differential map data transmitting section
330 map database
500 intersection candidate request information
700 intersection candidate information
800 differential map data

The invention claimed is:

1. A navigation device which acquires one or more differential map data in a differential map data set from a map delivery server via a communication line and updates the data, comprising:

a setting section that sets a destination of a vehicle;
a display unit that displays a navigation route from a current position of the navigation device to the destination;
a map database that stores therein a map data for computing the navigation route;
a differential map data storage unit that stores therein the differential map data acquired from the map delivery server;
a memory unit that memorizes a cache map data which is a map data on a surrounding area of the navigation device;
a satellite radiowave receiving unit that receives information on the current position of the navigation device using radiowave from a satellite;
an intersection candidate information acquisition section that transmits intersection candidate request information including the current position, the destination, and version information on the map data held by the navigation device to the map delivery server and acquires intersection candidate information which is information on a candidate of a new intersection on the navigation route from the map delivery server;
a differential map data acquisition section that acquires a differential map data in the differential map data set, the data including the intersection, from the map delivery server, and stores the acquired data in the differential map data storage unit;
an update map data selection section that estimates a time required for an update processing of a map data using each of one or more differential map data, compares the time required for the update processing to a time required for a vehicle to arrive at a next target intersection from a current position and selects a data in the differential map data set updatable in time before the vehicle arrives at the next target intersection, from among all data in the differential map data set stored in the differential map data storage unit;

an update order determination section that determines an update order for applying the differential map data from among the differential map data used for updating in order of arrival times at the intersection from shortest to longest; and a map data update processing section that updates the map database for the each data in the differential map data set selected by the update map data selection section according to the update order determined by the update order determination section and also updates the cache map data stored in the memory unit using the each data in the updated map database.

2. The navigation device according to claim 1, wherein the update map data selection section comprises a map update determination section that computes an arrival time for each candidate of the intersection, from a current position and a travelling speed of the navigation device and determines, if the arrival time is longer than a prescribed threshold value which is set as a time required for updating the differential map data set, that the data is updatable in time.

3. The navigation device according to claim 2, wherein the prescribed threshold value is computed by using a maximum route search completion time between the current position of the navigation device and the destination, a screen update time of the display unit, an update time of the map database, and an update time of the cache map data.

4. The navigation device according to claim 2, wherein the update map data selection section comprises a consistency determination section that determines whether or not point IDs at both ends of a link string of the differential map data which has been determined as updatable by the map update determination section are connected to the navigation route.

5. The navigation device according to claim 1, further comprising a navigation guidance section that makes the display unit display a candidate of the intersection after the intersection candidate information acquisition section acquires the intersection candidate information from the map delivery server.

6. A navigation method using a navigation device which acquires one or more differential map data in a differential map data set from a map delivery server via a communication line and updates the data, the navigation device comprising: a setting section that sets a destination of a vehicle; a display unit that displays a navigation route from a current position of the navigation device to the destination; a map database that stores therein a map data for computing the navigation route; a differential map data storage unit that stores therein the differential map data acquired from the map delivery server; a memory unit that memorizes a cache map data which is a map data on a surrounding area of the navigation device; and a satellite radiowave receiving unit that receives information on the current position of the navigation device using radiowave from a satellite, the navigation method comprising the steps of:
transmitting intersection candidate request information including the current position, the destination, and version information on the map data held by the navigation device to the map delivery server and acquiring intersection candidate information which is information on a candidate of a new intersection on the navigation route from the map delivery server;

acquiring a data in the differential map data set, the data including the intersection, from the map delivery server, and storing the acquired data in the differential map data storage unit;

estimating a time required for an update processing of a map data using each of one or more differential map data comparing the time required for the update processing to a time required for a vehicle to arrive at a next target intersection from a current position and selecting a data in the differential map data set updatable in time before the vehicle arrives at the next target intersection, from among all data in the differential map data set stored in the differential map data storage unit;

determining an update order for applying the differential map data from among the differential map data used for updating in order of arrival times at the intersection from shortest to longest; and updating the map database for the each data in the differential map data set selected by the update map data selection section according to the update order determined by the update order determination section and also updating the cache map data stored in the memory unit using the each data in the updated map database.

7. A navigation system in which a navigation device acquires one or more differential map data in a differential map data set, the data required for updating a map data, from a map delivery server via a communication line and performs a navigation guidance, wherein the navigation device comprises:
a setting section that sets a destination of a vehicle;
a display unit that displays a navigation route from a current position of the navigation device to the destination;
a map database that stores therein a map data for computing the navigation route;
a differential map data storage unit that stores therein the differential map data acquired from the map delivery server;
a memory unit that memorizes a cache map data which is a map data on a surrounding area of the navigation device;
a satellite radiowave receiving unit that receives information on the current position of the navigation device using radiowave from a satellite;
an intersection candidate information acquisition section that transmits intersection candidate request information including the current position, the destination, and version information on the map data held by the navigation device to the map delivery server and acquires intersection candidate information which is information on a candidate of a new intersection on the navigation route from the map delivery server;
a differential map data acquisition section that acquires a differential map data in the differential map data set, the data including the intersection, from the map delivery server, and stores the acquired data in the differential map data storage unit;
an update map data selection section that estimates a time required for an update processing of a map data using each of one or more differential map data, compares the time required for the update processing to a time required for a vehicle to arrive at a next target intersection from a current position and selects a data in the differential map data set updatable in time before the vehicle arrives at the next target intersection, from among all data in the differential map data set stored in the differential map data storage unit;

an update order determination section that determines an update order for applying the differential map data from among the differential map data used for updating in order of arrival times at the intersection from shortest to longest; and a map data update processing section that updates the map database for the each data in the differential map data set selected by the update map data selection section according to the update order determined by the update order determination section and also updates the cache map data stored in the memory unit using the each data in the updated map database, and wherein the map delivery server comprises:

a map data storage unit that stores therein a map database in which a map data for each map version is stored;

an intersection candidate information generation section that references the map data storage unit using the intersection candidate request information acquired from the navigation device and generates intersection candidate information which is information on a candidate of a new intersection on the navigation route;

an intersection candidate information transmitting section that transmits the generated intersection candidate information to the navigation device; and a differential map data transmitting section that transmits a differential map data including the intersection to the navigation device.

8. The navigation system according to claim 7, wherein, if information on a version of the map data transmitted from the navigation device is different from information on the latest version of the map data held by the map delivery server, the map delivery server further comprises:

a navigation route confirmation section computes a navigation route by referencing the current position and the destination of the navigation device, and the version information of the map data; and a difference extraction section that compares information on the latest version of the map data stored in the map data storage unit with the information on the version of the map data held by the map delivery server, detects a different portion between a pair of the map data, generates a differential map data, and extracts a candidate of a new intersection on the navigation route computed by the navigation route confirmation section from among the generated differential map data.

9. The navigation device according to claim 3, wherein the update map data selection section comprises a consistency determination section that determines whether or not point IDs at both ends of a link string of the differential map data which has been determined as updatable by the map update determination section are connected to the navigation route.

* * * * *